(12) United States Patent
Choi

(10) Patent No.: US 12,252,923 B2
(45) Date of Patent: *Mar. 18, 2025

(54) VEHICLE DOOR OPENING AND CLOSING APPARATUS

(71) Applicants: Hyundai Motor Company, Seoul (KR); Kia Corporation, Seoul (KR)

(72) Inventor: Je Won Choi, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 305 days.

This patent is subject to a terminal disclaimer.

(21) Appl. No.: 17/948,723

(22) Filed: Sep. 20, 2022

(65) Prior Publication Data

US 2023/0340829 A1    Oct. 26, 2023

(30) Foreign Application Priority Data

Apr. 21, 2022    (KR) .................. 10-2022-0049644

(51) Int. Cl.
  *B60J 5/04*    (2006.01)
  *B60J 5/06*    (2006.01)
  (Continued)

(52) U.S. Cl.
  CPC ............. *E05F 15/638* (2015.01); *B60J 5/047* (2013.01); *B60J 5/06* (2013.01); *E05F 15/63* (2015.01); *E05F 15/655* (2015.01); *E05Y 2201/41* (2013.01); *E05Y 2201/422* (2013.01); *E05Y 2201/684* (2013.01); *E05Y 2201/688* (2013.01);
  (Continued)

(58) Field of Classification Search
  CPC ... B60J 5/04; B60J 5/0477; B60J 5/047; B60J 5/0479; B60J 5/06; E05F 15/638; E05F 15/619; E05F 15/655; E05F 15/63; E05Y 2201/22; E05Y 2201/224; E05Y 2201/41; E05Y 2201/422; E05Y 2201/626; E05Y 2201/684; E05Y 2201/688; E05Y 2201/716; E05Y 2201/722; E05Y 2800/102; E05Y 2900/531; E05B 81/16; E05D 15/48; E05D 2015/485
  See application file for complete search history.

(56) References Cited

U.S. PATENT DOCUMENTS 11,472,271 B2 * 10/2022 Choi .................. B60J 5/047
11,512,515 B2 * 11/2022 Choi .................. B60J 5/0473
(Continued)

FOREIGN PATENT DOCUMENTS

KR    20210057616 A    5/2021

*Primary Examiner* — Gregory A Blankenship
(74) *Attorney, Agent, or Firm* — Slater Matsil, LLP

(57) ABSTRACT

An embodiment is a vehicle door opening and closing apparatus including a vehicle door configured to be selectively opened and closed in a mode of a sliding mode and a swing mode to uncover and cover a door opening of a vehicle body. The vehicle door opening and closing apparatus further including a rail mounted on the vehicle body, a roller unit including a roller and a hinge element, the roller being configured to be guided along the rail, the hinge element being spaced apart from the roller, a door-side bracket mounted on the vehicle door, the door-side bracket being detachably connected to the roller unit, and a body-side bracket mounted on the vehicle body, the body-side bracket being detachably connected to the roller unit.

19 Claims, 32 Drawing Sheets

(51) Int. Cl.
*E05F 15/63* (2015.01)
*E05F 15/638* (2015.01)
*E05F 15/655* (2015.01)

(52) U.S. Cl.
CPC ... *E05Y 2201/722* (2013.01); *E05Y 2600/626* (2013.01); *E05Y 2900/531* (2013.01)

(56) References Cited

U.S. PATENT DOCUMENTS

| | | | | |
|---|---|---|---|---|
| 11,572,726 B2* | 2/2023 | Choi | ............... | E05B 85/243 |
| 11,629,539 B2* | 4/2023 | Choi | ............... | E05D 15/101 |
| | | | | 49/164 |
| 11,643,860 B2* | 5/2023 | Choi | ............... | E05F 15/638 |
| | | | | 49/362 |
| 11,725,448 B2* | 8/2023 | Choi | ............... | E05B 81/76 |
| | | | | 49/362 |
| 11,745,568 B2* | 9/2023 | Choi | ............... | E05B 85/10 |
| | | | | 296/146.1 |
| 11,781,367 B2* | 10/2023 | Choi | ............... | E05F 15/619 |
| | | | | 49/362 |
| 11,945,288 B2* | 4/2024 | Choi | ............... | E05B 85/26 |
| 11,987,106 B2* | 5/2024 | Choi | ............... | E05C 17/203 |
| 2005/0264207 A1* | 12/2005 | Kang | ............... | H01J 11/44 |
| | | | | 313/586 |
| 2013/0227887 A1* | 9/2013 | Ojima | ............... | B60J 5/0477 |
| | | | | 49/143 |
| 2019/0135349 A1* | 5/2019 | Nusier | ............... | B60J 5/06 |
| 2021/0140215 A1* | 5/2021 | Choi | ............... | E05B 83/40 |
| 2021/0140216 A1* | 5/2021 | Choi | ............... | E05B 83/40 |
| 2021/0170839 A1* | 6/2021 | Choi | ............... | E05B 85/10 |
| 2021/0172228 A1* | 6/2021 | Choi | ............... | E05D 15/48 |
| 2021/0172235 A1* | 6/2021 | Choi | ............... | E05B 81/16 |
| 2021/0172236 A1* | 6/2021 | Choi | ............... | E05D 15/48 |
| 2021/0172237 A1* | 6/2021 | Choi | ............... | E05D 15/48 |
| 2022/0090421 A1* | 3/2022 | Choi | ............... | E05B 81/76 |
| 2022/0090427 A1* | 3/2022 | Choi | ............... | E05B 85/243 |
| 2022/0412142 A1* | 12/2022 | Lee | ............... | E05D 15/58 |
| 2023/0340805 A1* | 10/2023 | Choi | ............... | E05B 81/14 |
| 2023/0340808 A1* | 10/2023 | Choi | ............... | E05B 83/40 |
| 2023/0340809 A1* | 10/2023 | Choi | ............... | E05B 81/76 |
| 2023/0340829 A1* | 10/2023 | Choi | ............... | E05F 15/63 |

* cited by examiner

VEHICLE DOOR OPENING AND CLOSING APPARATUS

CROSS-REFERENCE TO RELATED APPLICATIONS

This application is based on and claims the benefit of priority to Korean Patent Application No. 10-2022-0049644, filed on Apr. 21, 2022, in the Korean Intellectual Property Office, the disclosure of which is incorporated herein in its entirety by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to cover the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of users seeking ease of use, diversity, and novelty.

The above information described in this background section is provided to assist in understanding the background of the embodiments of the invention, and may include technical concepts that do not form the prior art that is already known to a person of ordinary skill in the art.

SUMMARY

The present disclosure relates to a vehicle door opening and closing apparatus allowing a vehicle door to open and close in any one mode selected from a swing mode and a sliding mode. More particularly, the present disclosure relates to a vehicle door opening and closing apparatus allowing a vehicle door to be stably opened and closed in any mode of a swing mode and a sliding mode by allowing a center roller unit to be selectively and detachably connected to a vehicle door and a vehicle body as one of the swing mode and the sliding mode is selected.

The present disclosure has been made to solve the above-mentioned problems occurring in the prior art while advantages achieved by the prior art are maintained intact.

An aspect of the present disclosure provides a vehicle door opening and closing apparatus allowing a vehicle door to open and close in any one mode selected from a swing mode and a sliding mode to thereby meet the needs of users, and allowing the vehicle door to be stably opened and closed in any mode of the swing mode and the sliding mode by allowing a center roller unit to be selectively and detachably connected to the vehicle door and a vehicle body as one of the swing mode and the sliding mode is selected.

According to an aspect of the present disclosure, a vehicle door opening and closing apparatus may include: a vehicle door which is selectively opened and closed in any one mode of a sliding mode and a swing mode to uncover and cover a door opening of a vehicle body; a rail mounted on the vehicle body; a roller unit including a roller guided along the rail, and a hinge element spaced apart from the roller; a door-side bracket mounted on the vehicle door, and detachably connected to the roller unit; and a body-side bracket mounted on the vehicle body, and detachably connected to the roller unit.

The body-side bracket may be detachable from the roller unit when the door-side bracket is connected to the roller unit, and the door-side bracket may be detachable from the roller unit when the body-side bracket is connected to the roller unit.

The door-side bracket may be detachably connected to the hinge element by a movement of a hinge pin.

The door-side bracket may be connected to or detached from the hinge element as the hinge pin moves in a hole of the door-side bracket and a hole of the hinge element.

The door-side bracket may include a door-side base fixed to the vehicle door, and a door-side hinge arm extending from the door-side base toward the hinge element.

The door-side hinge arm may include a hinge hole into which the hinge pin is engaged or inserted and from which the hinge pin is disengaged.

The body-side bracket may be detachably connected to the hinge element by a movement of a restraint pin.

The body-side bracket may be connected to or detached from the hinge element as the restraint pin moves in a hole of the body-side bracket and a hole of the hinge element.

The body-side bracket may include a body-side base fixed to the vehicle body, and a restraint arm extending from the body-side base toward the hinge element.

The restraint arm may include a restraint hole into which the restraint pin is engaged or inserted and from which the restraint pin is disengaged.

The vehicle door may be opened and closed in the sliding mode when the door-side bracket is connected to the hinge element and the body-side bracket is detached from the hinge element.

The vehicle door may be opened and closed in the swing mode when the body-side bracket is connected to the hinge element and the door-side bracket is detached from the hinge element.

The door-side bracket may be detachably connected to the hinge element by a movement of a hinge pin, the hinge pin may have rack teeth provided on at least a portion of an exterior surface thereof, the rack teeth of the hinge pin may mesh with teeth of a gear rotated by an actuator, and the hinge pin may move linearly as the gear rotates.

The body-side bracket may be detachably connected to the hinge element by a movement of a restraint pin, the restraint pin may have rack teeth provided on at least a portion of an exterior surface thereof, the rack teeth of the restraint pin may mesh with the gear, and the restraint pin may move linearly as the gear rotates.

The hinge pin and the restraint pin may face each other with the gear disposed therebetween so that the hinge pin and the restraint pin move linearly in opposite directions.

The vehicle door opening and closing apparatus may further include a connection body mounted on the hinge element, wherein the hinge pin, the restraint pin, the actuator, and the gear may be disposed inside the connection body.

The rail may be a center rail extending from an edge of the door opening of the vehicle body in a longitudinal direction of the vehicle body.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
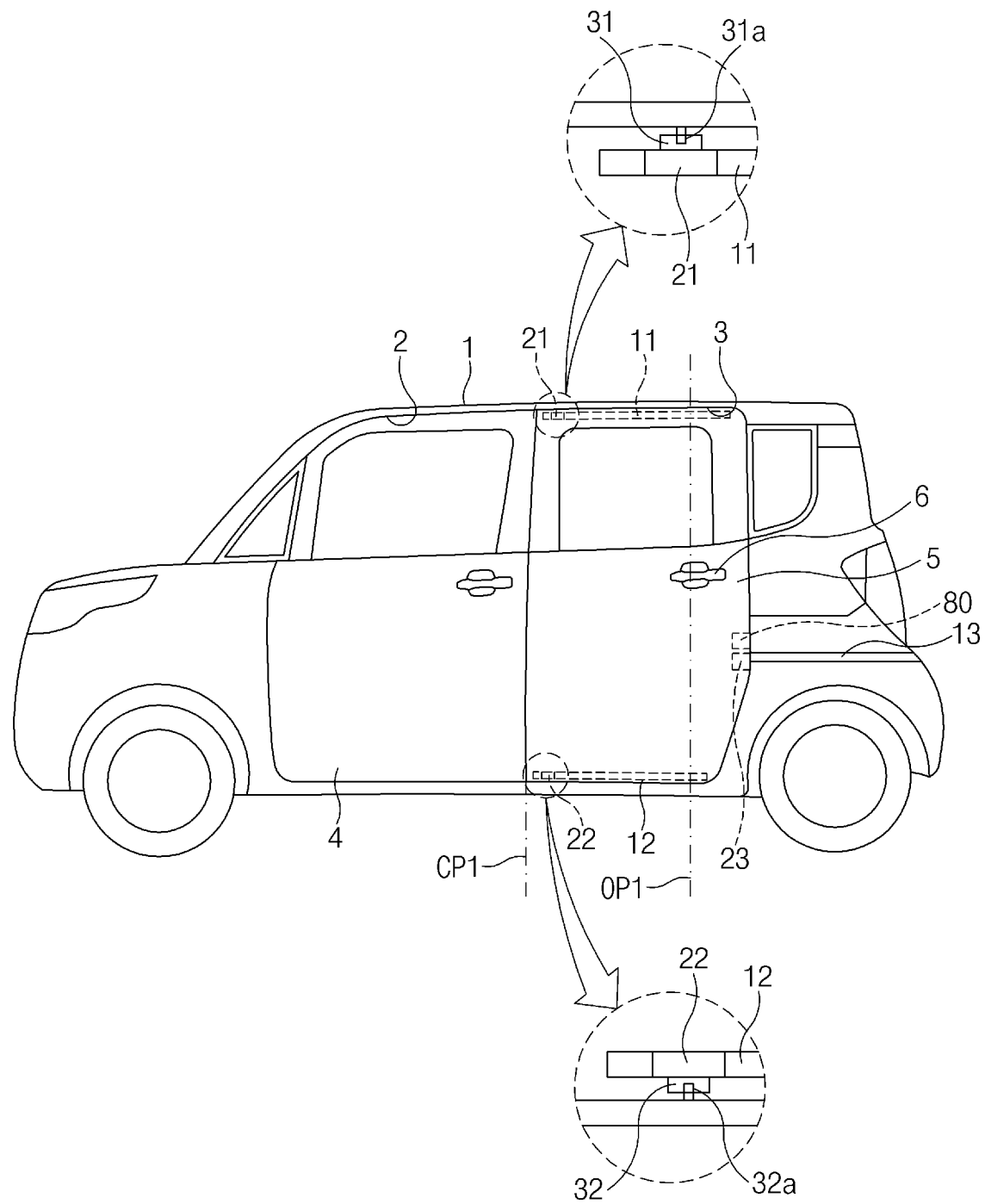
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails n and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

The vehicle door opening and closing apparatus, according to exemplary embodiments of the present disclosure, may further include the center rail 13 mounted on a central portion of the vehicle, and a center roller unit 23 guided along the center rail 13.

Figure 3:
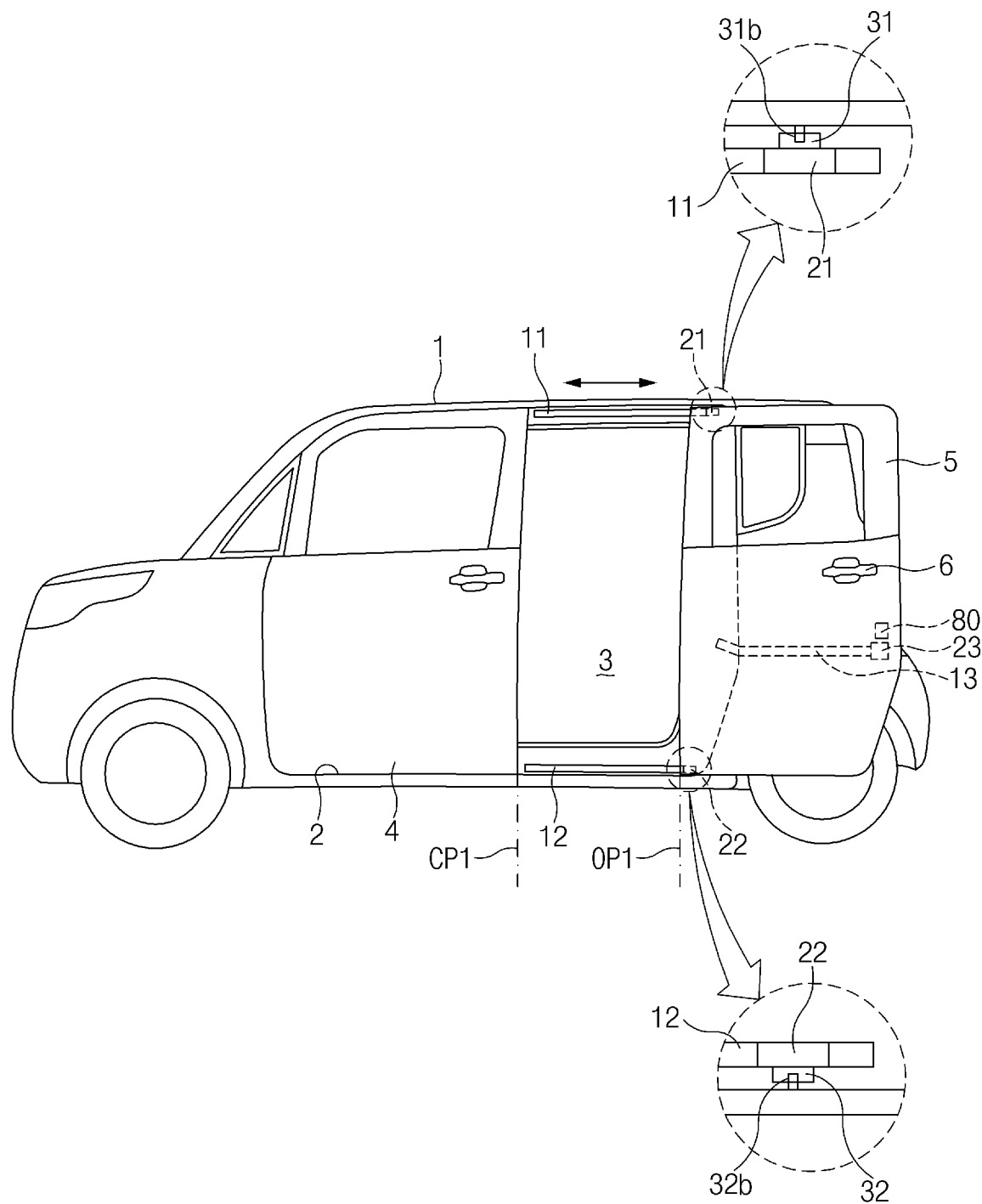
FIG. 3 illustrates a state in which the door of FIG. 1 is opened in a sliding mode.

Referring to FIGS. 1 and 3, the upper roller unit 21 may be mounted on an upper end of the vehicle door 5, and the upper roller unit 21 may slide along the upper rail 11. The lower roller unit 22 may be mounted on a lower end of the vehicle door 5, and the lower roller unit 22 may slide along the lower rail 12.

Figure 2:
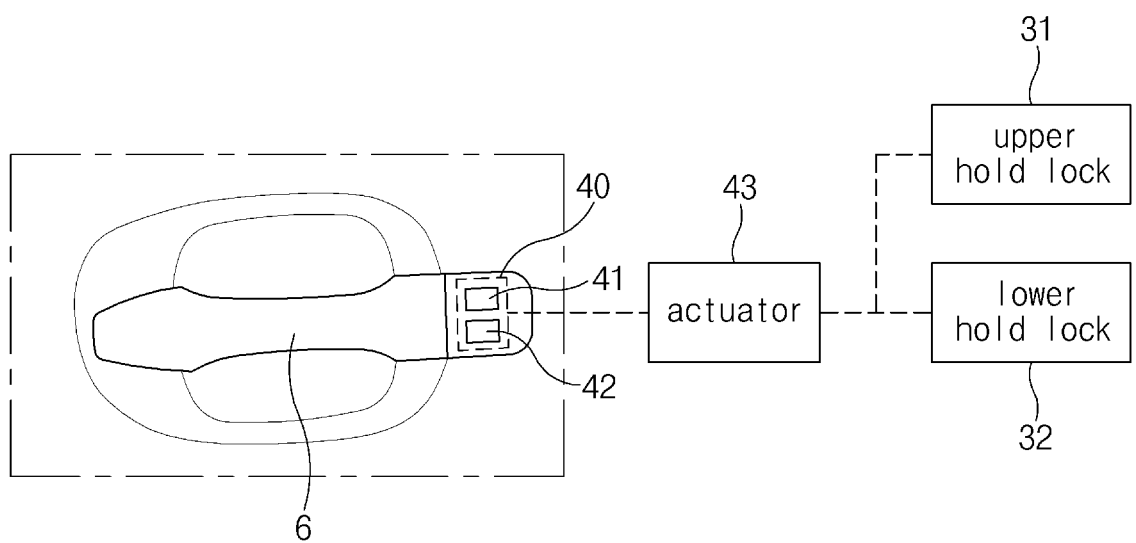
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be disposed on the outside handle 6 or a portion of the vehicle door adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
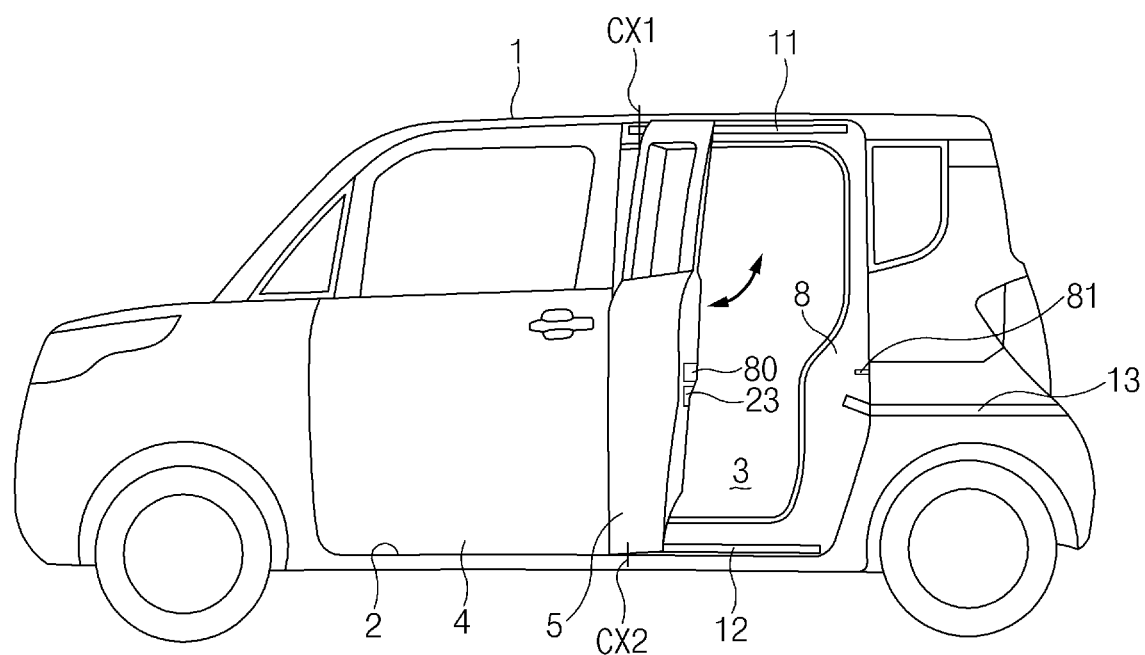
FIG. 4 illustrates a state in which the door of FIG. 1 is opened in a swing mode.
Figure 6:
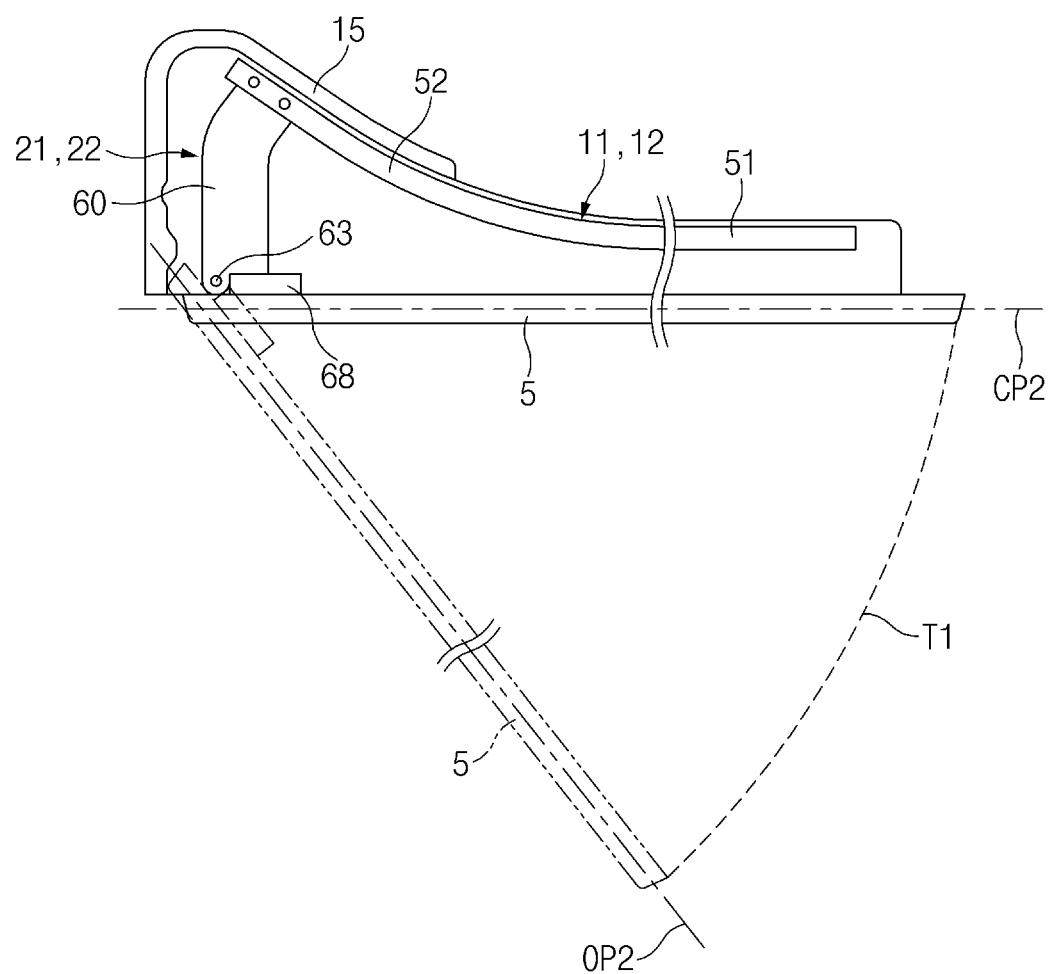
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. The vehicle door 5 swings from the second closed position CP2 to the second open position OP2 along a swing trajectory T1. In particular, when the vehicle door 5 is held in the first closed position CP1, the swing mode may be operated.

The upper roller unit 21 may have an upper hold lock 31, and the vehicle body 1 may have a first upper striker 31*a* and a second upper striker 31*b* protruding downwardly from a top portion of the vehicle body 1. The first upper striker 31*a* may be aligned with or adjacent to a virtual axis of the first closed position CP1, and the second upper striker 31*b* may be aligned with or adjacent to a virtual axis of the first open position OP1.

According to an exemplary embodiment, as illustrated in FIGS. 1 and 3, the upper hold lock 31 may releasably hold the first upper striker 31*a* in the first closed position CP1, and releasably hold the second upper striker 31*b* in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1 so that the vehicle door 5 may be kept in the first closed position CP1. As the upper hold lock 31 holds the second upper striker 31b, the upper roller unit 21 may be firmly held in the first open position OP1 so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and the upper open hold lock may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIG. 4, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from a floor of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1 so that the vehicle door 5 may be kept in the first closed position CP1. As the lower hold lock 32 holds the second lower striker 32b, the lower roller unit 22 may be firmly held in the first open position OP1 so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and the lower open hold lock may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32 so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, such as being collinear, and the vehicle door 5 may rotate around the vertically aligned upper and lower rotation axes CX1 and CX2.

Referring to FIG. 2, the selector 4o may be electrically connected to an actuator 43, and the actuator 43 may be configured to operate the upper hold lock 31 and the lower hold lock 32.

As the user selects the selector 4o, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 4o in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 4o in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an upper actuator operating the upper hold lock 31 and a lower actuator operating the lower hold lock 32 may be individually connected to the selector 40.

FIGS. 9A to 9D illustrate the upper hold lock 31 and the lower hold lock 32 according to an exemplary embodiment of the present disclosure. Referring to FIGS. 9A to 9D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 9A to 9D, the upper hold lock 31 may releasably hold the first upper striker 31a, and the lower hold lock 32 may releasably hold the first lower striker 32a.

Figure 9A:
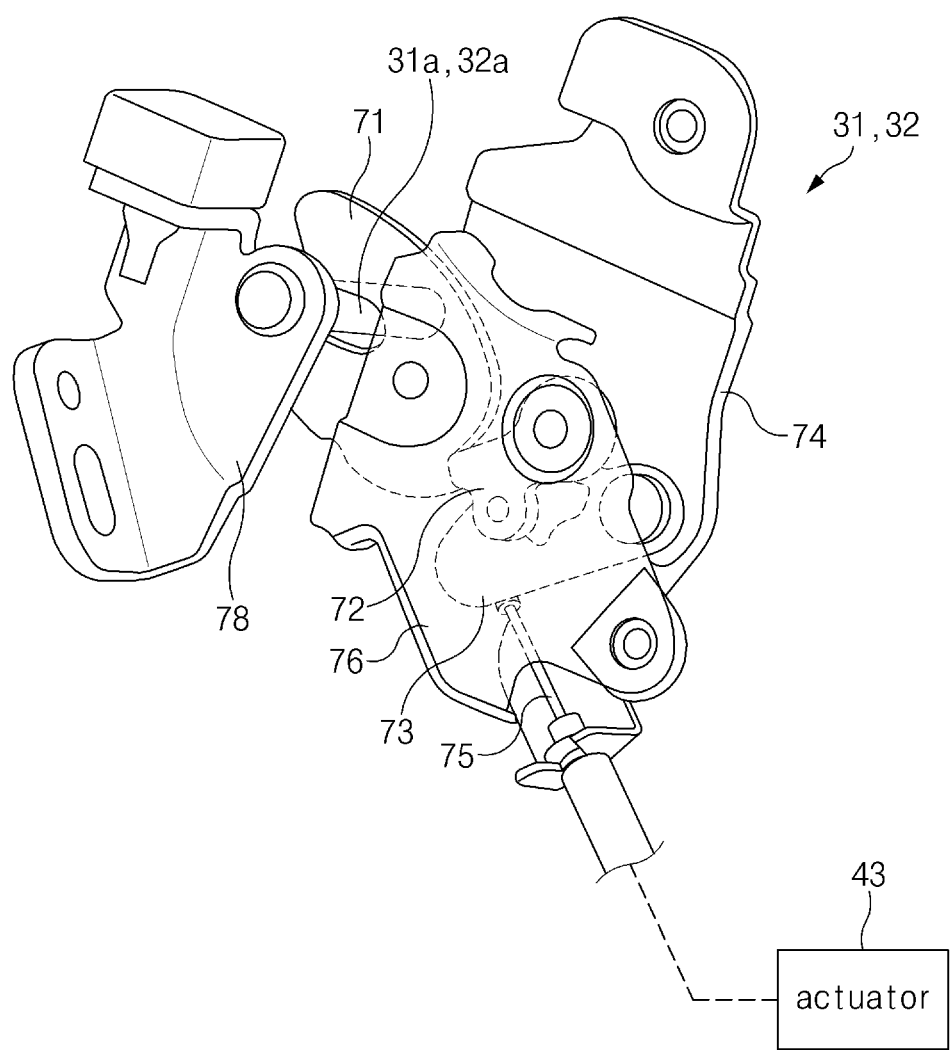
FIG. 9A illustrates a perspective view of an upper hold lock and a lower hold lock.
Figure 9B:
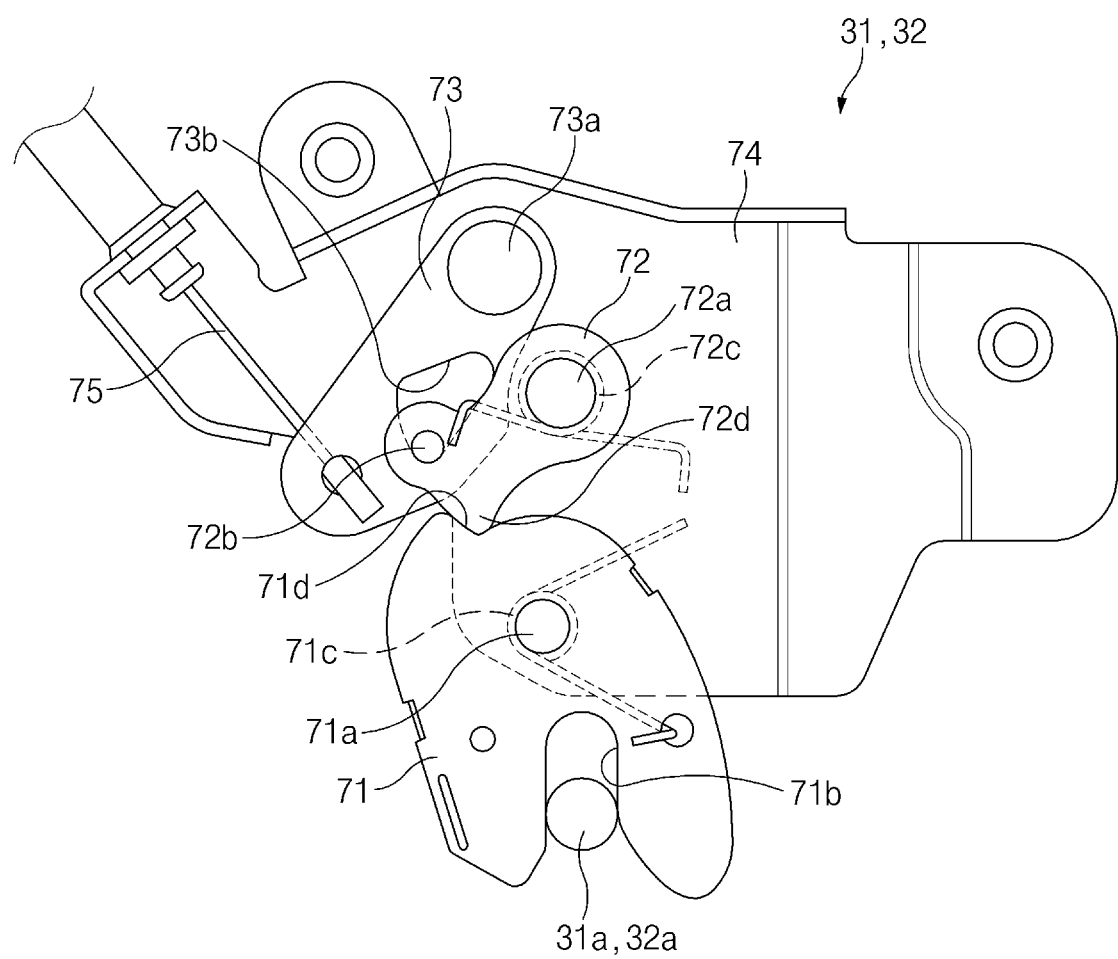
FIG. 9B illustrates a state in which an upper hold lock and a lower hold lock hold corresponding strikers.
Figure 9C:
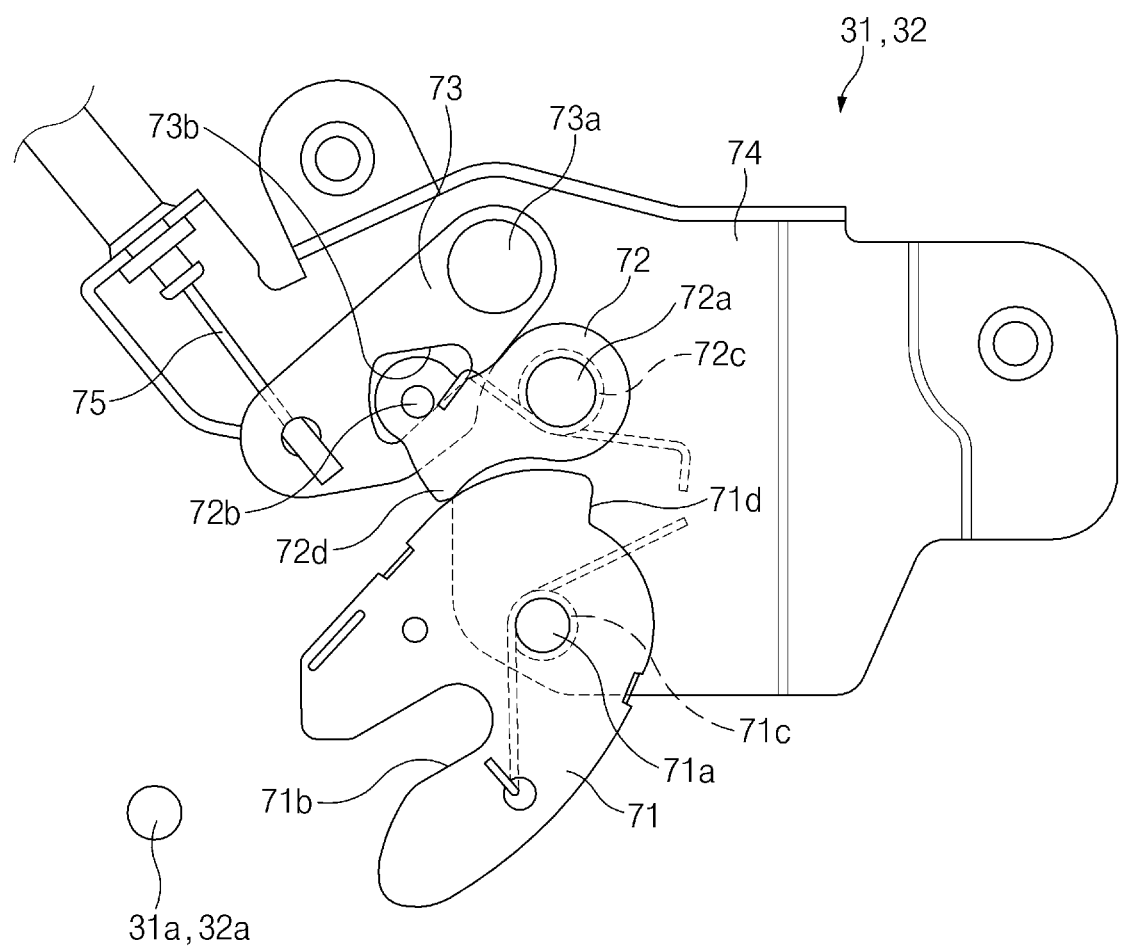
FIG. 9C illustrates a state in which an upper hold lock and a lower hold lock release corresponding strikers.

The catch 71 may be pivotally mounted on the mounting plate 74 through a first pivot shaft via. The catch 71 may have a slot 71b receiving the strikers 31a and 32a, and the catch 71 may engage with or release the strikers 31a and 32a. The catch 71 may move between an engaging position (see FIG. 9B) and a release position (see FIG. 9C). The engaging position refers to a position in which the catch 71 engages with the strikers 31a and 32a as illustrated in FIG. 9B, and the release position refers to a position in which the catch 71 releases the strikers 31a and 32a as illustrated in FIG. 9C. When the catch 71 is in the engaging position as illustrated in FIG. 9B, the catch 71 may engage with the strikers 31a and 32a so that the catch 71 may hold the strikers 31a and 32a. When the catch 71 is in the release position as illustrated in FIG. 9C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft via. The catch 71 may have a locking shoulder 71d.

Figure 9D:
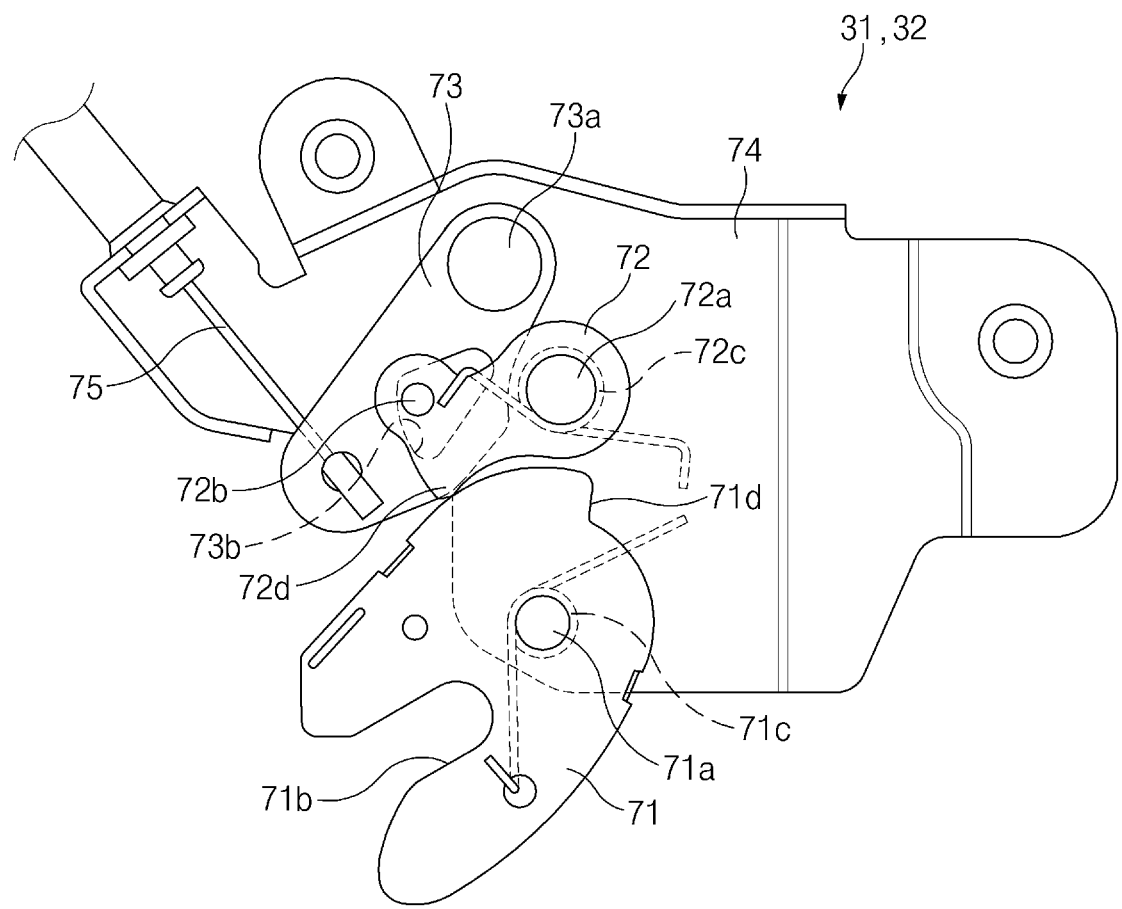
FIG. 9D illustrates a state in which an upper hold lock and a lower hold lock are allowed to receive corresponding strikers.

The pawl 72 may be pivotally mounted on the mounting plate 74 through a second pivot shaft 72a, and the pawl 72 may move between a pawl locking position (see FIG. 9B) and a pawl release position (see FIGS. 9C and 9D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 9B, when the pawl 72 is in the pawl locking position, the movement (rotation) of the catch 71 may be restricted by the pawl 72 so that the catch 71 may be kept in the engaging position. As illustrated in FIGS. 9C and 9D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 9B) by a second biasing element 72c such as a torsion spring. The second biasing element 72c may be disposed around the second pivot shaft 72a.

The pawl 72 may have a locking projection 72d engageable with the locking shoulder 71d of the catch 71. As illustrated in FIG. 9B, as the pawl 72 is moved to the pawl locking position by the second biasing element 72c, the locking projection 72d of the pawl 72 may engage with the locking shoulder 71d of the catch 71 so that the movement (rotation) of the catch 71 may be restricted, and accordingly the catch 71 may be kept in the engaging position. As illustrated in FIG. 9C, as the pawl 72 is moved to the pawl release position by the lever 73, the locking projection 72d of the pawl 72 may be released from the locking shoulder 71d of the catch 71 so that the movement (rotation) of the catch 71 may be allowed, and accordingly the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. As the cable 75 is reversed, the lever 73 may move the pawl 72 to the pawl release position (see FIG. 9C).

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 9B, when the cable 75 is advanced by the actuator 43, the locking projection 72d of the pawl 72 may engage with the locking shoulder 71d of the catch 71 so that the movement (rotation) of the catch 71 may be restricted. Accordingly, the catch 71 may be kept in the engaging position, and the strikers 31a and 32a may be held in the slot 71b of the catch 71. That is, the upper hold lock 31 and the lower hold lock 32 may hold the corresponding strikers 31a and 32a.

As illustrated in FIG. 9C, when the cable 75 is reversed by the actuator 43, the lever 73 may move the pawl 72 to the pawl release position. The locking projection 72d of the pawl 72 may be released from the locking shoulder 71d of the catch 71 so that the movement (rotation) of the catch 71 may be allowed. Accordingly, the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 9D, even when the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowable. In this state, the strikers 31a and 32a may be allowed to be received in the slot 71b of the catch 71. That is, in a state in which the movement (rotation) of the catch 71 is allowable as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When an external force applied through the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 9B, as the locking projection 72d of the pawl 72 engages with the locking shoulder 71d of the catch 71, the catch 71 may hold the strikers 31a and 32a.

Figure 5:
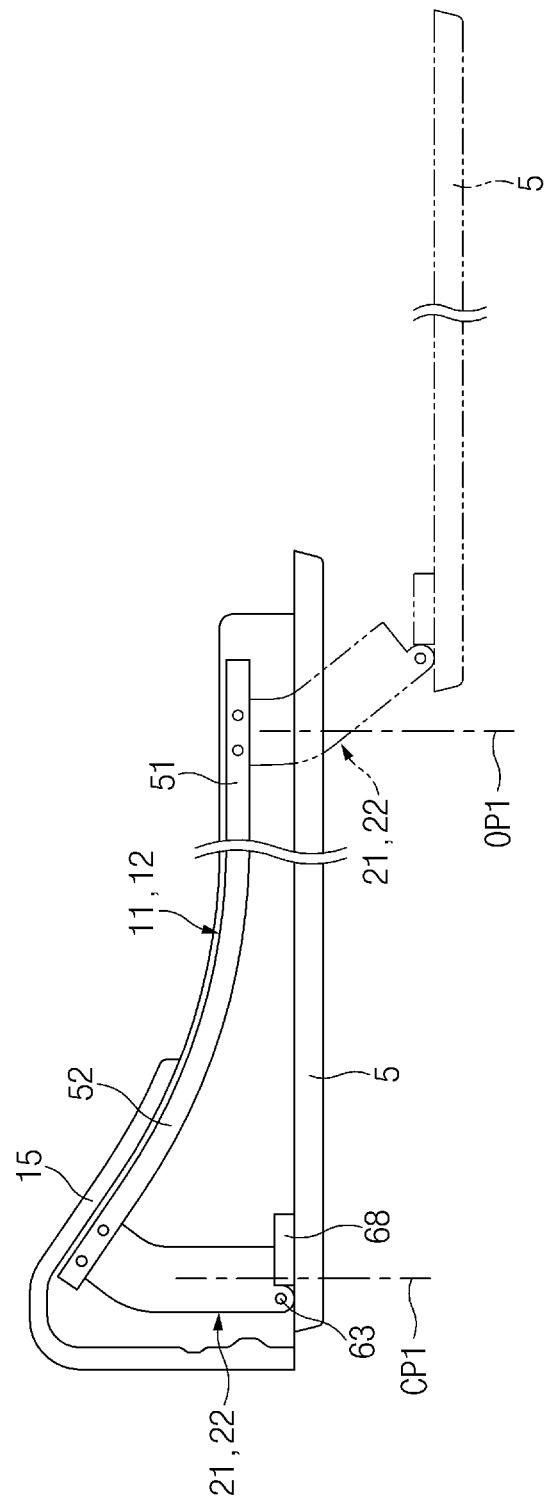
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 7:
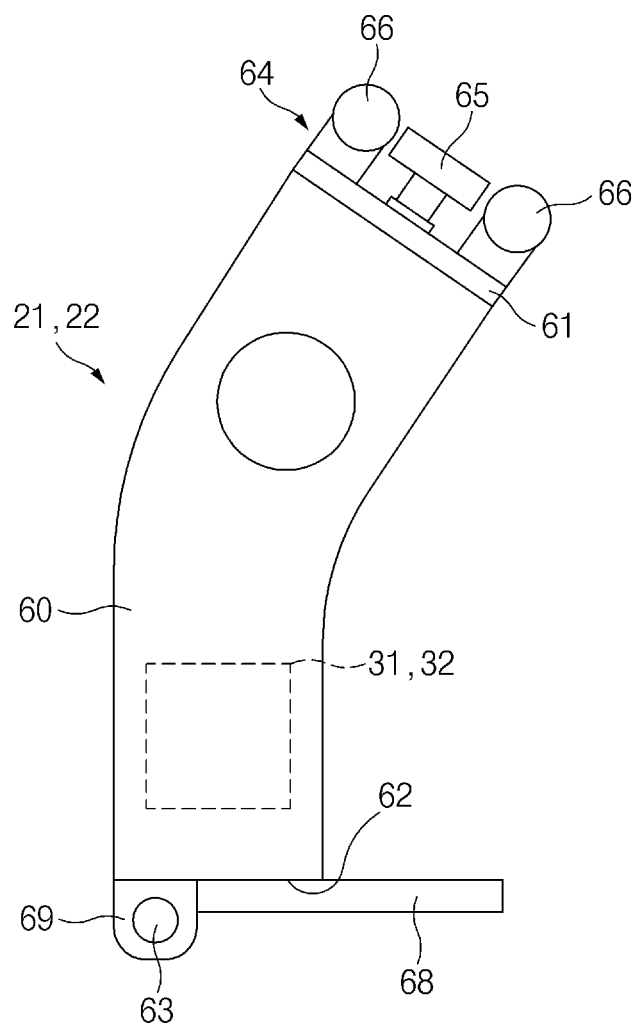
FIG. 7 illustrates an upper roller unit and a lower roller unit in a vehicle door opening and closing apparatus according to an exemplary embodiment of the present disclosure.
Figure 8:
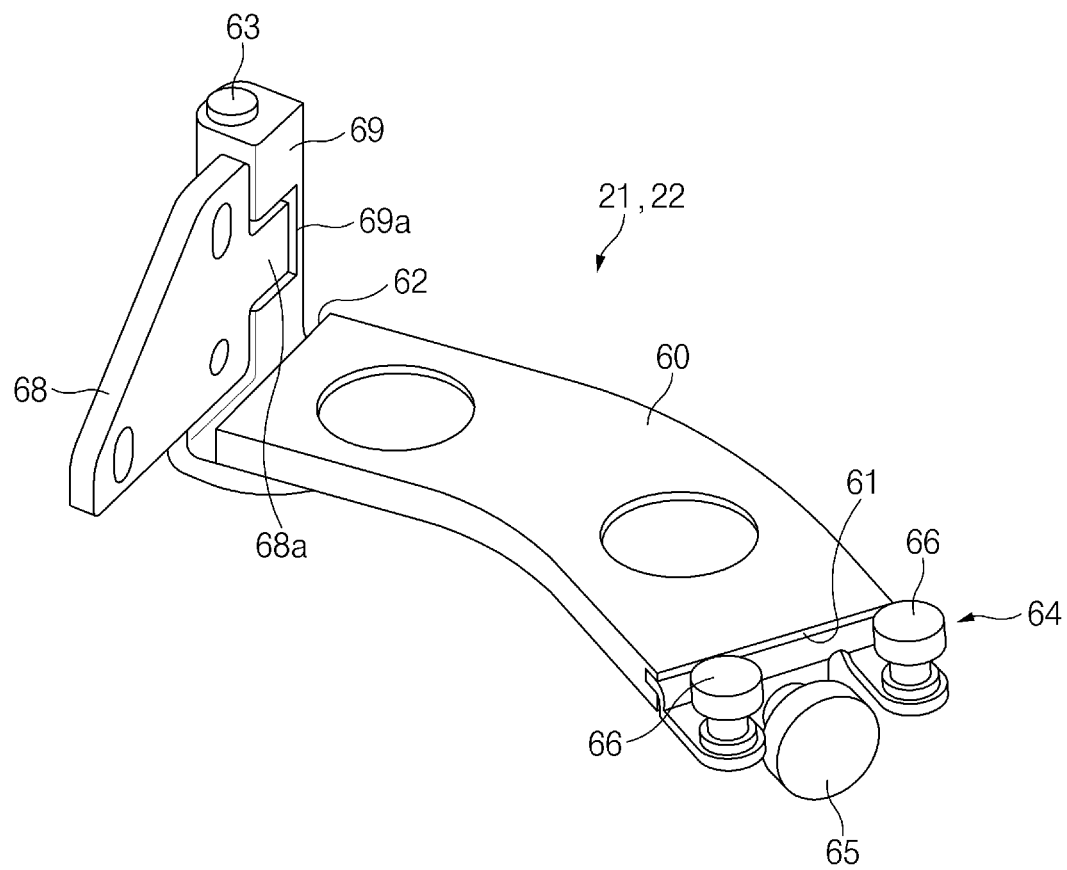
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides with respect to the middle roller 65 may be rotatably mounted on the roller bracket 64. A rotation axis of the middle roller 65 may be perpendicular to a rotation axis of the side roller 66.

The body 60 may be curved so as not to interfere with the first extension portion 51 and the second extension portion 52. The body 60 may have a first end portion 61 facing the interior of the vehicle, and a second end portion 62 facing the exterior of the vehicle. The first end portion 61 of the body 60 may be fixed to the roller bracket 64 using fasteners, welding, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly fixed to the first end portion 61 of the body 60 using fasteners, welding, and/or the like, and the second end portion 62 of the body 60 may be pivotally connected to the vehicle door 5 through the pivot pin 63. A first pivot bracket 68 may be fixed to the vehicle door 5 using fasteners, welding, and/or the like, and a second pivot bracket 69 may be fixed to the second end portion 62 of the body 60 using fasteners, welding, and/or the like. The first pivot bracket 68 may have a lug 68a, and the second pivot bracket 69 may have a recess 69a. The lug 68a of the first pivot bracket 68 may be fitted into the recess 69a of the second pivot bracket 69, and the pivot pin 63 may extend through the lug 68a of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, and accordingly the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. Accordingly, the vehicle door 5 may move between the second closed position CP2 in which the vehicle door 5 is closed and the second open position OP2 in which the vehicle door 5 is opened.

Referring to FIG. 4, a main latch 80 may be mounted on a rear edge of the vehicle door 5, and a main striker 81 may be mounted on a peripheral face of the vehicle body 1 adjacent to a door frame area 8 of the vehicle body 1. The door frame area 8 refers to a frame area of the vehicle body 1 defining the door aperture 3. The main latch 80 may be located adjacent to the center roller unit 23, and the main striker 81 may be located adjacent to a front portion of the center rail 13.

Figure 10:
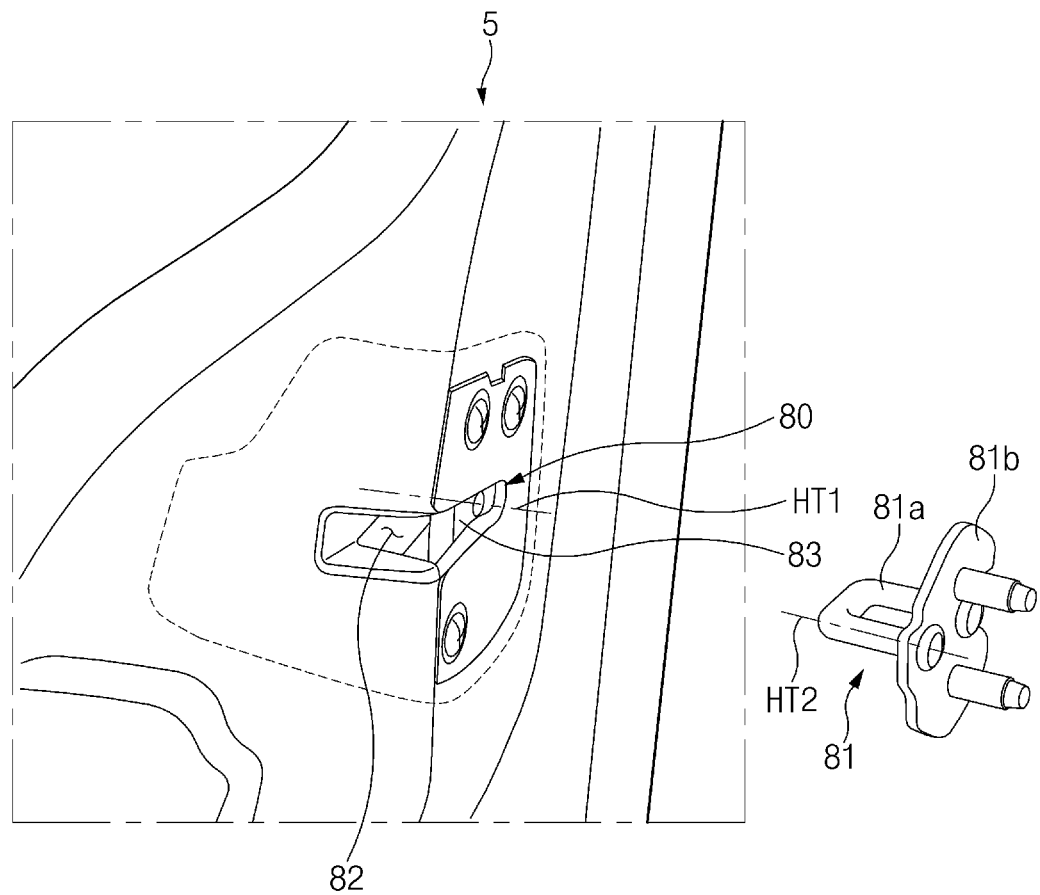
FIG. 10 illustrates a main latch mounted on a vehicle door and a main striker.

Referring to FIG. 10, the main latch 80 may be mounted on the rear edge of the vehicle door 5, and the main latch 80 may include a catch 83 rotatable around a rotation axis HT1 extending in the longitudinal direction of the vehicle. The main striker 81 may include a U-shaped rod 81a, and a base 81b, fixed to the vehicle body 1. A slot 82 may be formed in the rear edge of the vehicle door 5, and the U-shaped rod 81a may be received in the slot 82 when the vehicle door 5 is closed. The U-shaped rod 81a may have a longitudinal axis HT2 extending in the longitudinal direction of the vehicle. The rotation axis HT1 of the catch 83 may be parallel to the longitudinal axis HT2 of the U-shaped rod 81a. In particular, the rotation axis HT1 of the catch 83 and the longitudinal axis HT2 of the U-shaped rod 81a may extend horizontally. The catch 83 of the main latch 80 may releasably engage with the rod 81a of the main striker 81. When the vehicle door 5 is in the first closed position CP1 or the second closed position CP2, the catch 83 of the main latch 80 may engage with the rod 81a of the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the catch 83 of the main latch 80 may release the rod 81a of the main striker 81 by a release operation of the outside handle 6 so that the vehicle door 5 may be allowed to move in the sliding mode or the swing mode. When the vehicle door 5 is held in the first closed position CP1 and the catch 83 of the main latch 80 releases the rod 81a of the main striker 81, the center roller unit 23 may be released from the center rail 13, and thus the vehicle door 5 may be opened and closed in the swing mode.

Referring to FIGS. 1 and 3, the center rail 13 may extend along a center line of the vehicle body 1, and the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted adjacent to a rear end of the vehicle door 5. The center roller unit 23 may be guided along the center rail 13.

Figure 11:
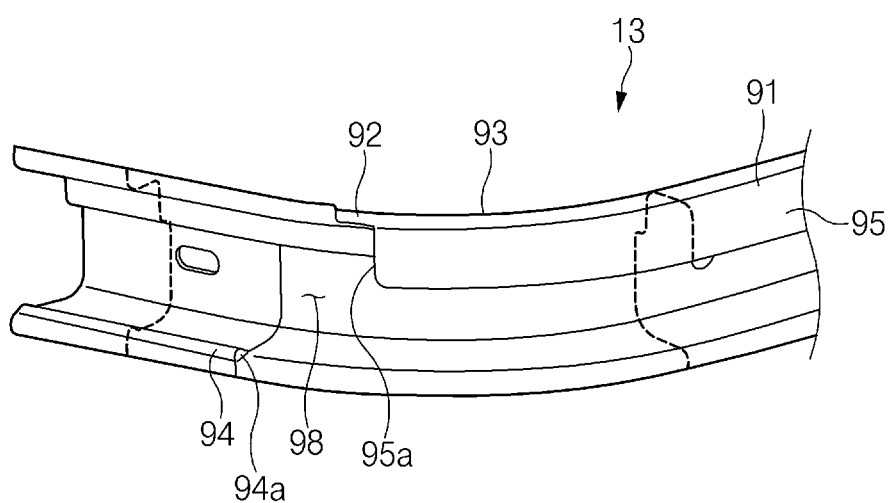
FIG. 11 illustrates a perspective view of a center rail in a vehicle door opening and closing apparatus according to an exemplary embodiment of the present disclosure.

Referring to FIG. 11, the center rail 13 may include a sliding guide 91 extending straightly in the longitudinal direction of the vehicle, and a swing guide 92 extending from the sliding guide 91 toward the interior of the vehicle. The swing guide 92 may be bent at a predetermined angle with respect to the sliding guide 91 through a bending portion 93, and the bending portion 93 may be curved at a predetermined radius.

Figure 12:
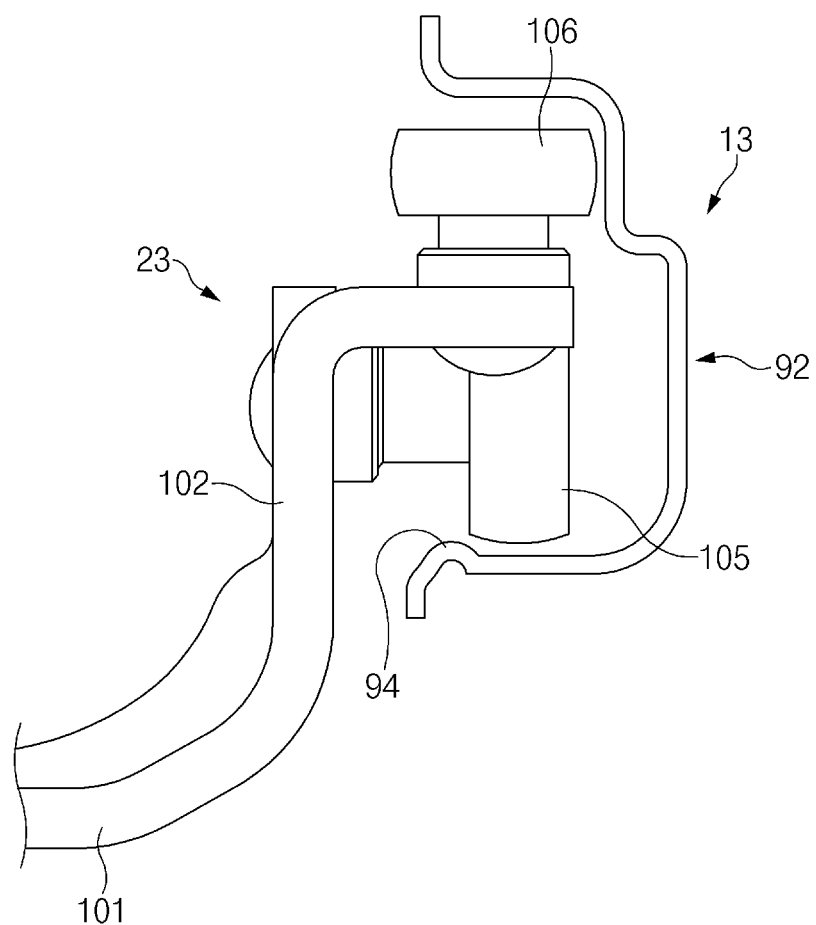
FIG. 12 illustrates a cross-sectional view of a swing guide of a center rail.
Figure 13:
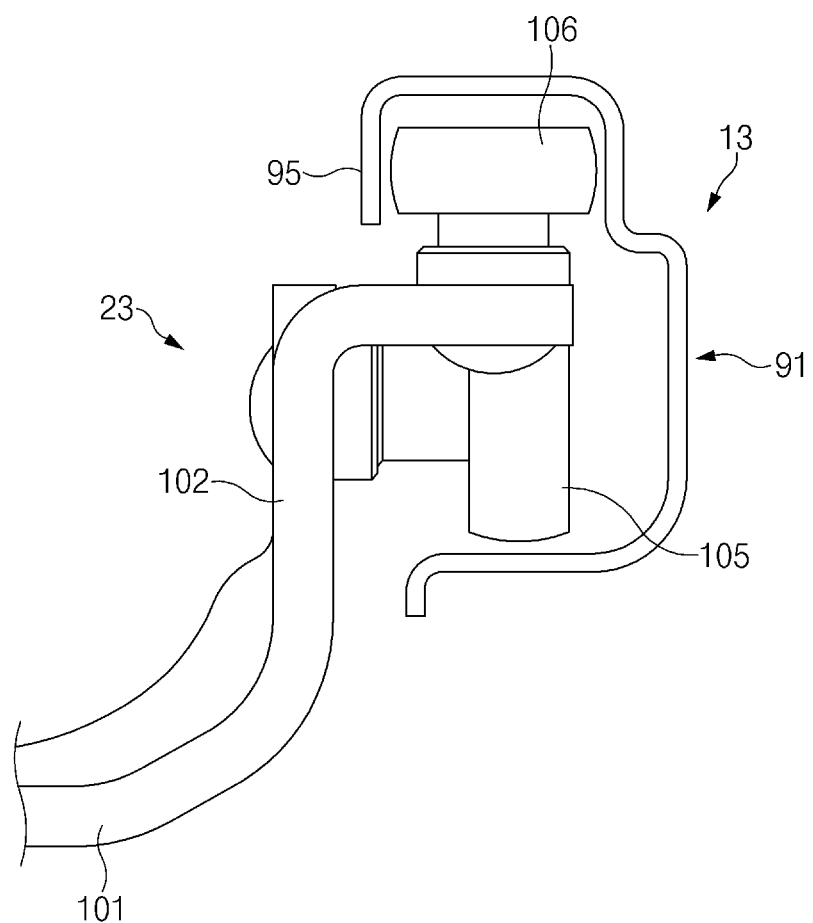
FIG. 13 illustrates a cross-sectional view of a sliding guide of a center rail.
Figure 14:
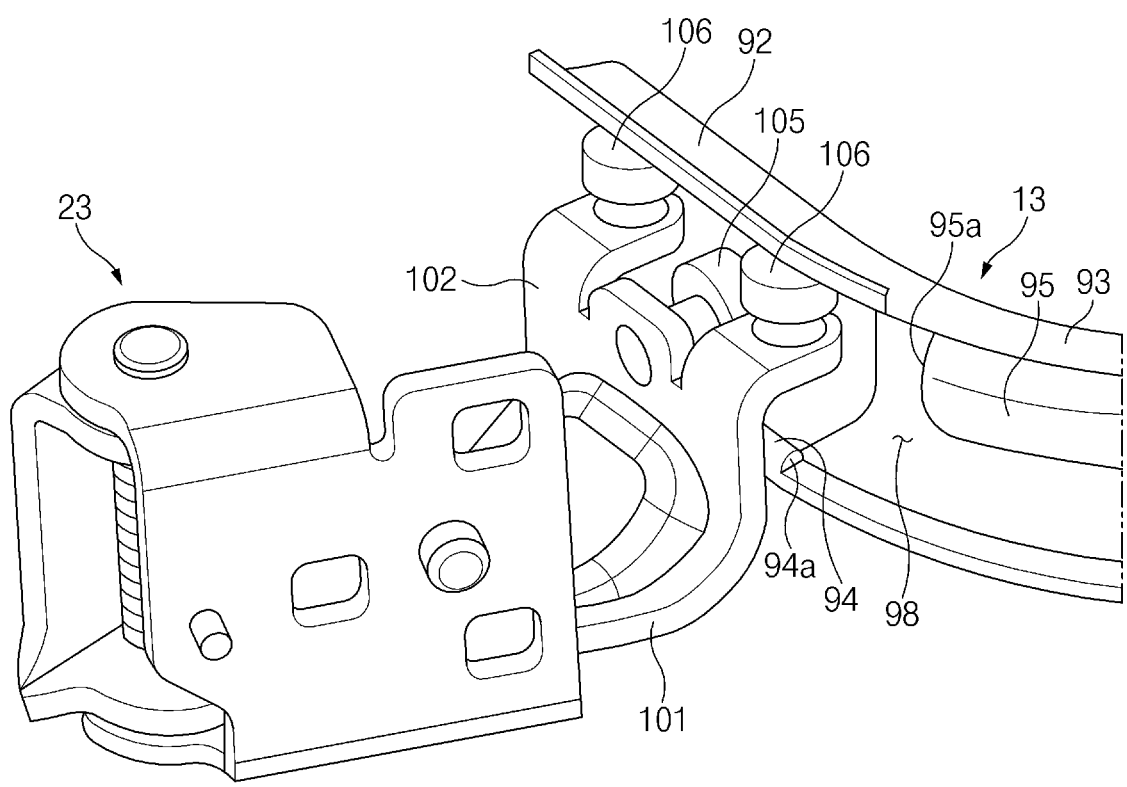
FIG. 14 illustrates a perspective view of a structure in which a center roller unit is held in a swing guide of a center rail.

Referring to FIGS. 12 to 14, the center roller unit 23 may include a roller bracket 101 and rollers 105 and 106 rotatably mounted on the roller bracket 101. The roller bracket 101 may include a first end portion adjacent to the center rail 13, and a second end portion relatively far from the center rail 13. The roller bracket 101 may be pivotally mounted on the central portion of the vehicle door 5, and the roller bracket 101 may include a roller arm 102 bent toward the center rail 13. The roller arm 102 may be bent from the first end portion of the roller bracket 101 at a predetermined angle. Specifically, the roller arm 102 may be perpendicular to the roller bracket 101. The plurality of rollers 105 and 106 may be rotatably mounted on the roller arm 102, and the plurality of rollers 105 and 106 may roll along the center rail 13. As illustrated in FIG. 14, a middle roller 105 and two side rollers 106 disposed on both sides with respect to the middle roller 105 may be rotatably mounted on the roller arm 102 of the roller bracket 101. A rotation axis of the middle roller 105 may be perpendicular to a rotation axis of the side roller 106. The rollers 105 and 106 of the center roller unit 23 may be located on an upper portion of the center rail 13.

When the sliding mode is selected and the vehicle door 5 slides in the longitudinal direction of the vehicle, the sliding guide 91 may guide the rollers 105 and 106 of the center roller unit 23.

Referring to FIGS. 11 and 13, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located on an upper portion of the sliding guide 91. The stopper wall 95 may partially block an upper portion of the opening of the sliding guide 91 so that the sliding guide 91 may be partially opened to the exterior of the vehicle. In particular, the stopper wall 95 may be located to face the rollers 105 and 106 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from being separated from the sliding guide 91 as illustrated in FIG. 13.

When the swing mode is selected and the vehicle door 5 is opened and closed in the swing mode, the swing guide 92 may allow the rollers 105 and 106 of the center roller unit 23 to be released from the center rail 13.

The swing guide 92 may have an opening which is entirely open to the door aperture 3 and/or the exterior of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1, the middle roller 105 of the center roller unit 23 may be guided along the guide projection 94 as illustrated in FIG. 12.

Figure 15:
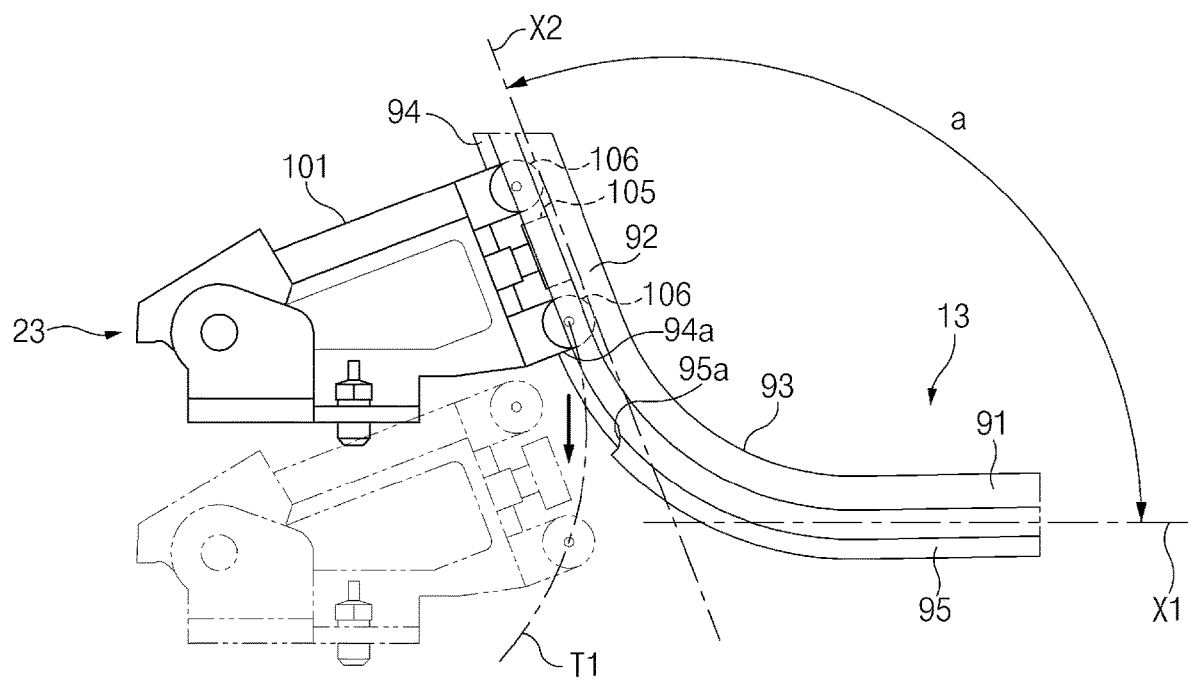
FIG. 15 illustrates a release operation in which a center roller unit is released from a swing guide of a center rail.

A front end 95a of the stopper wall 95 of the sliding guide 91 and a rear end 94a of the guide projection 94 may be located so as not to interfere with the swing trajectory T1 of the vehicle door 5. In addition, as illustrated in FIG. 15, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Due to the space 98, there is no interference when the rollers 105 and 106 of the center roller unit 23 are released from the center rail 13 or are received in the center rail 13 in the swing mode.

Meanwhile, according to the exemplary embodiment illustrated in FIGS. 11 to 15, when malfunction of the main latch 80 or deformation of the vehicle door 5 or the swing guide 92 due to an external impact occurs in the sliding mode, the rollers 105 and 106 of the center roller unit 23 may be separated from the swing guide 92 of the center rail 13, and thus the vehicle door 5 may fail to be easily opened and closed in the sliding mode.

To deal with this problem, the vehicle door opening and closing apparatus, according to exemplary embodiments of the present disclosure, may be designed to prevent the rollers 105 and 106 of the center roller unit 23 from being separated from the swing guide 92 of the center rail 13 in any mode of the swing mode and the sliding mode, and allow the center roller unit 23 to be selectively and detachably connected to the vehicle door 5 and a portion of the vehicle body 1 adjacent to the vehicle door 5 as any one mode of the swing mode and the sliding mode is selected. In particular, the center roller unit 23 may be detachably connected to the rear edge of the vehicle door 5 and the door frame area 8 of the vehicle body 1 adjacent to the door aperture 3. Thus, the vehicle door 5 may be stably opened and closed in any mode of the swing mode and the sliding mode.

Figure 16:
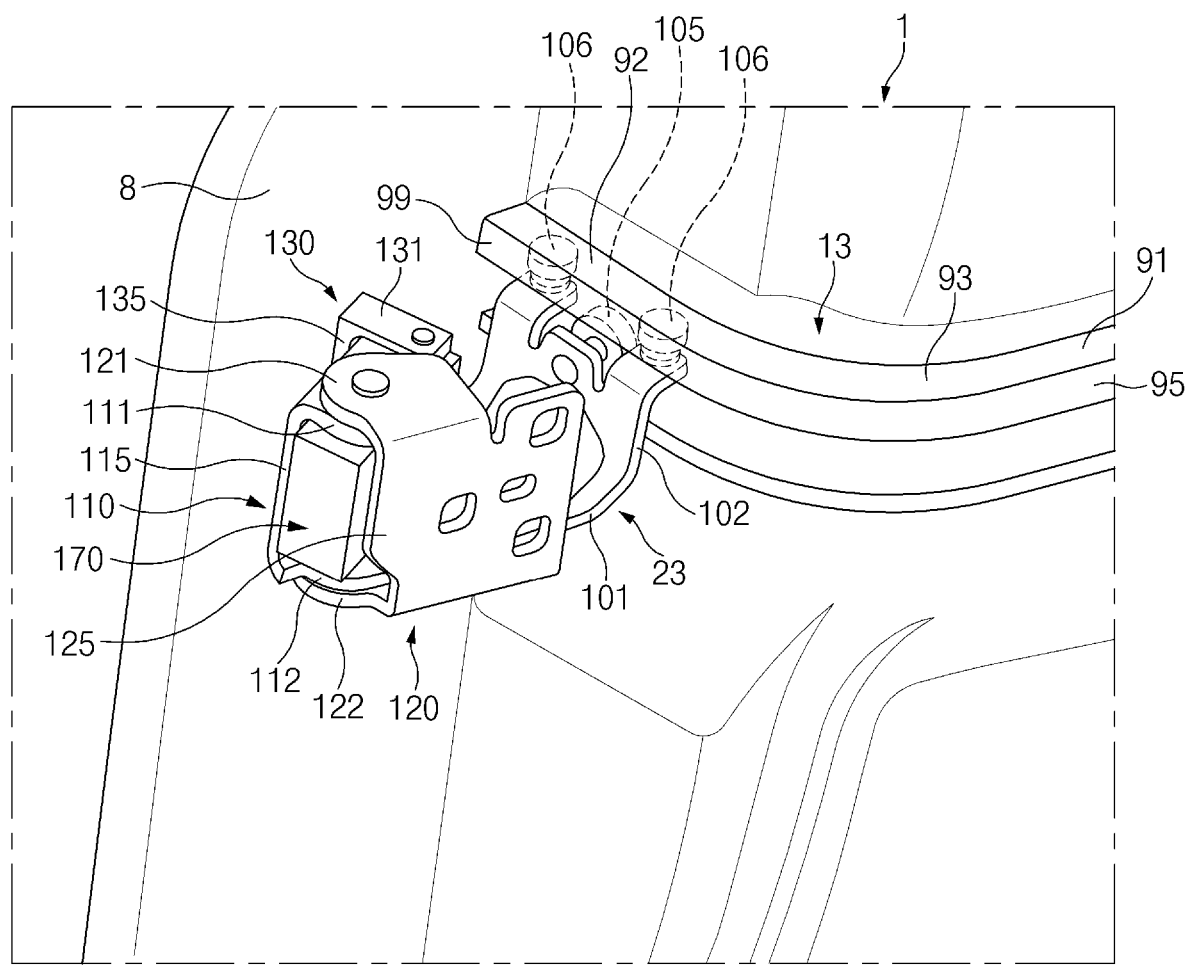
FIG. 16 illustrates a front perspective view of the connection of a center roller unit, a door-side bracket, and a body-side bracket in a vehicle door opening and closing apparatus according to an exemplary embodiment of the present disclosure.
Figure 17:
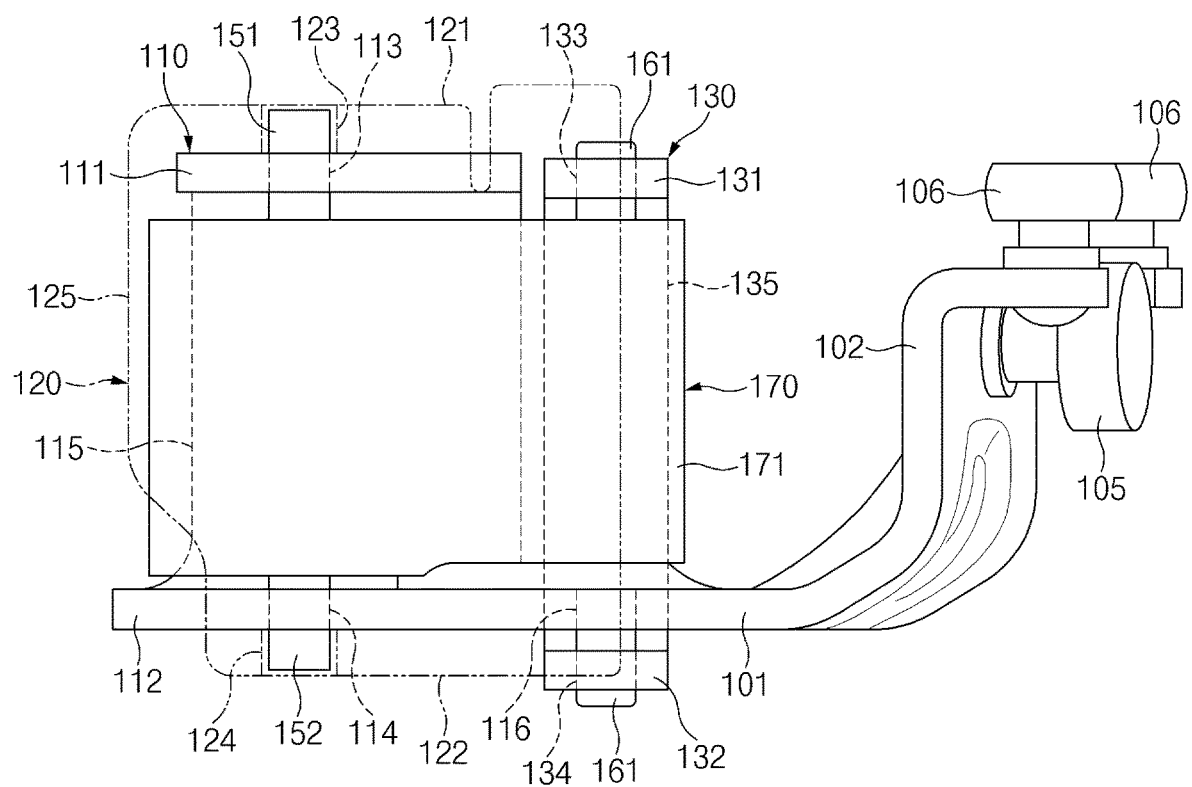
FIG. 17 illustrates a front view of the connection of a center roller unit, a door-side bracket, and a body-side bracket in a vehicle door opening and closing apparatus according to an exemplary embodiment of the present disclosure.

Referring to FIG. 16, the swing guide 92 of the center rail 13 may have a stopper wall 99 extending from the stopper wall 95 of the sliding guide 91. Accordingly, the stopper wall 99 of the swing guide 92 may prevent the rollers 105 and 106 of the center roller unit 23 from being separated from the swing guide 92. Thus, the rollers 105 and 106 of the center roller unit 23 may not be separated from the center rail 13 in any mode of the swing mode and the sliding mode.

Figure 18:
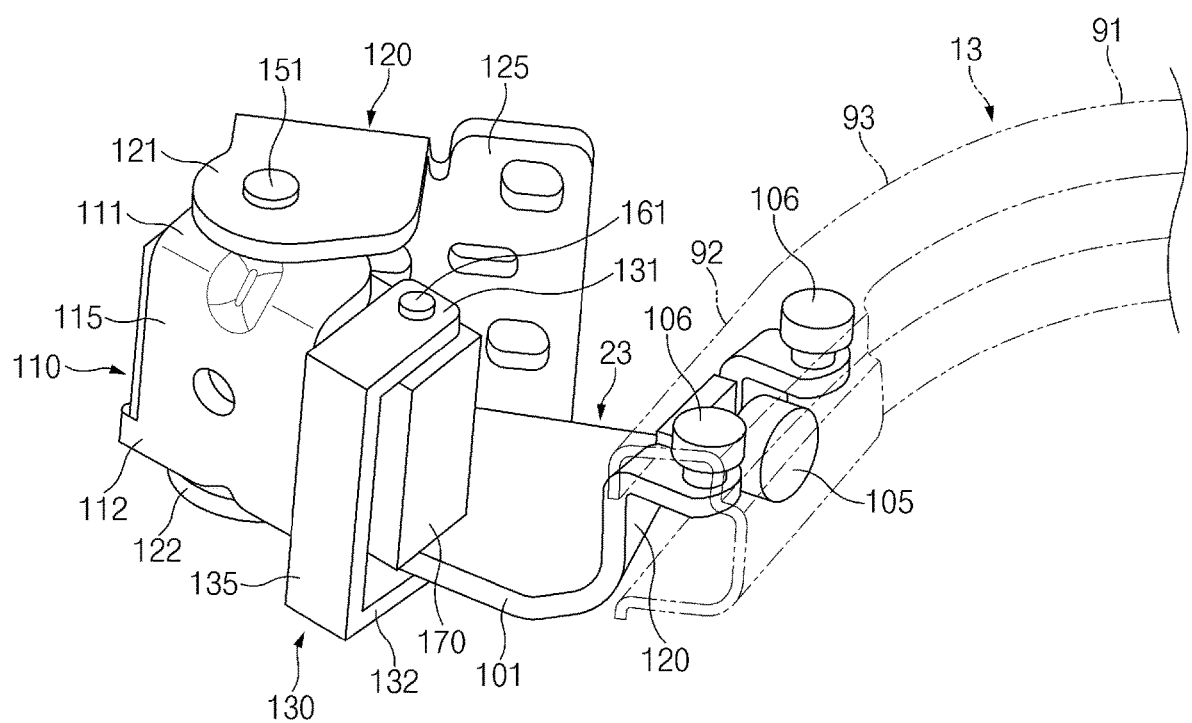
FIG. 18 illustrates a rear perspective view of the connection of a center roller unit, a door-side bracket, and a body-side bracket in a vehicle door opening and closing apparatus according to an exemplary embodiment of the present disclosure.
Figure 19:
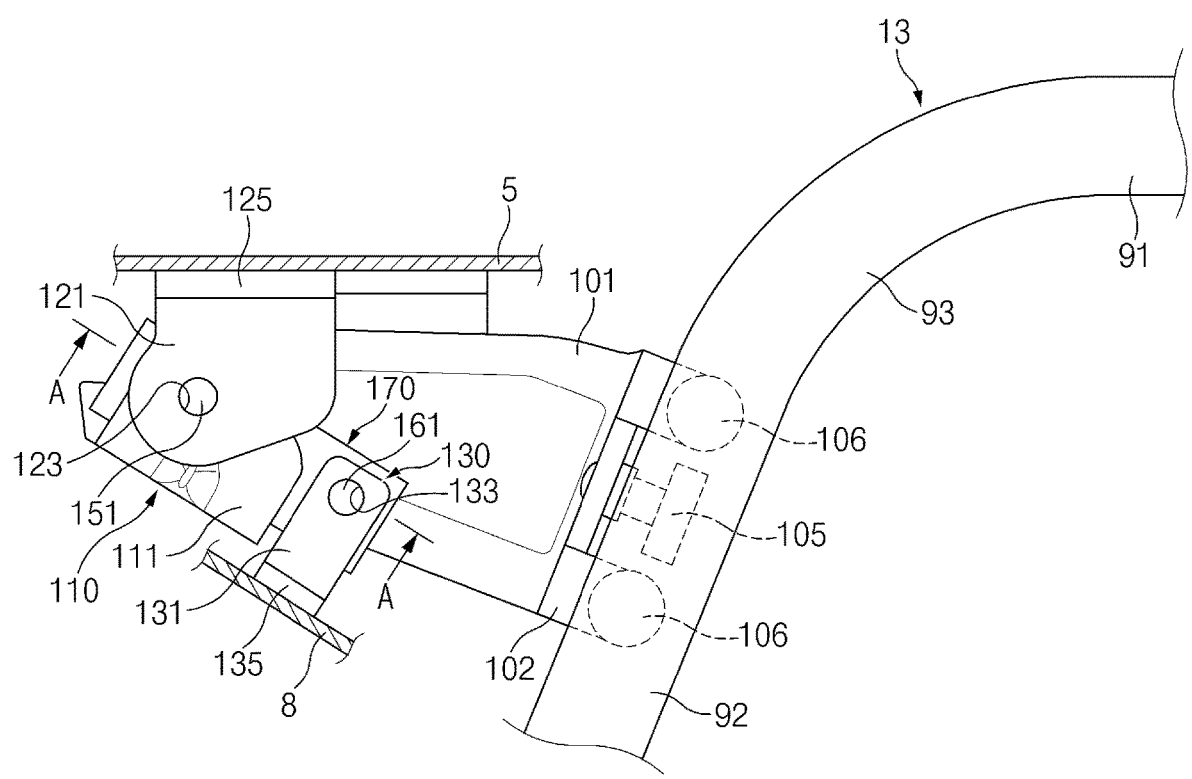
FIG. 19 illustrates a plan view of the connection of a center roller unit, a door-side bracket, and a body-side bracket in a vehicle door opening and closing apparatus according to an exemplary embodiment of the present disclosure.

Referring to FIG. 16, the center roller unit 23 may include a hinge element 110 connected to the roller bracket 101 of the center roller unit 23. The hinge element 110 may be integrally connected to the roller bracket 101 of the center roller unit 23. The hinge element 110 may be provided on the second end portion of the roller bracket 101. The hinge element 110 may be integrally formed with the roller bracket 101 so that the hinge element 110 and the roller bracket 101 may form a unitary one-piece structure. The hinge element 110 may include a base 115, and a first hinge arm 111 and a second hinge arm 112 may extend from the base 115. The first hinge arm 111 may be spaced apart from the second hinge arm 112. The first hinge arm 111 and the second hinge arm 112 may be angled from the base 115. The base 115 may be perpendicular to the roller bracket 101, and the first hinge arm 111 and the second hinge arm 112 may be perpendicular to the base 115. Referring to FIG. 18, the second hinge arm 112 may extend continuously from the second end portion of the roller bracket 101 in a longitudinal direction thereof, and the second hinge arm 112 and the roller bracket 101 may form a unitary one-piece structure. The first hinge arm 111 may be substantially parallel to the second hinge arm 112 and the roller bracket 101.

Figure 20:
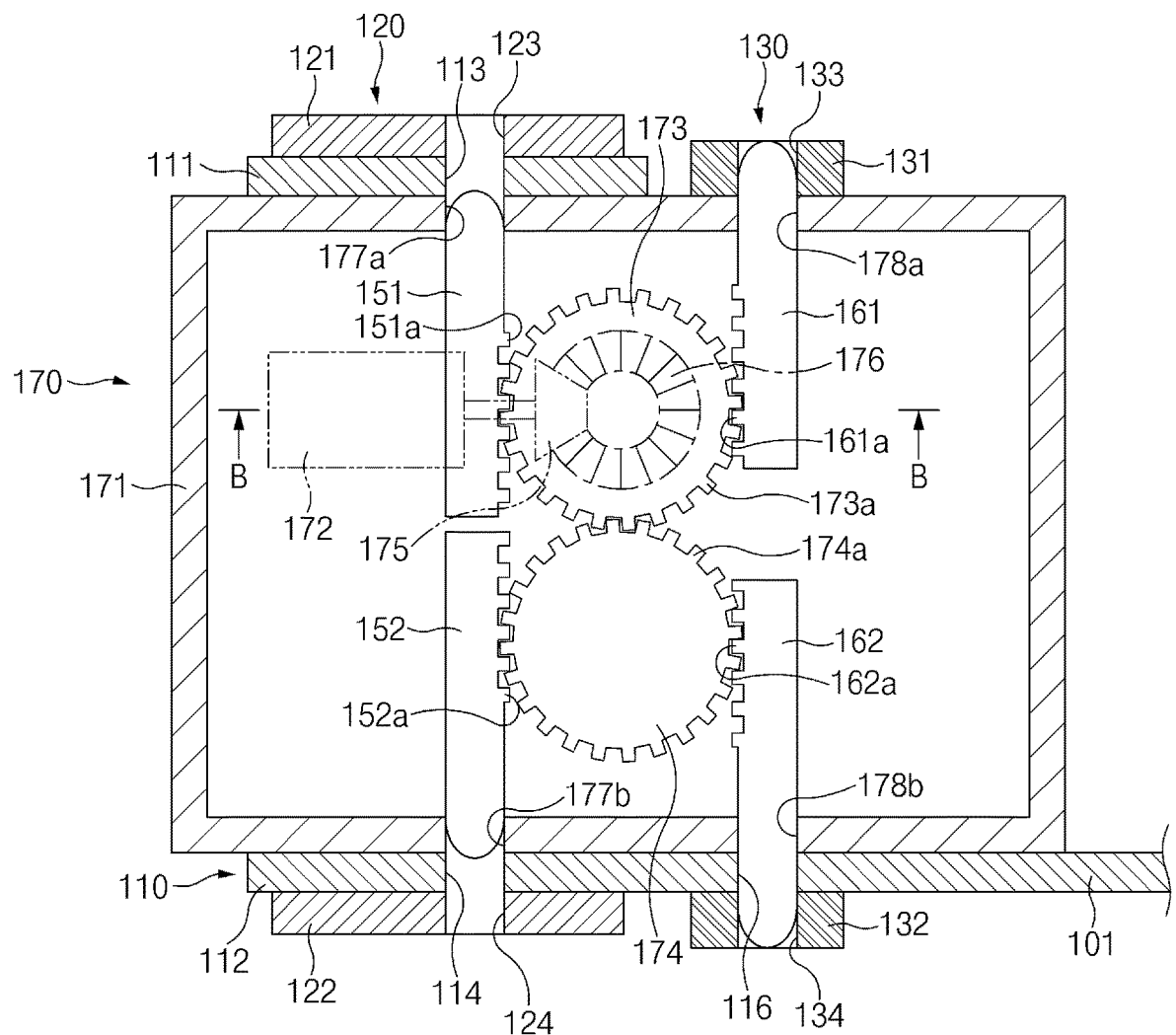
FIG. 20 illustrates a cross-sectional view of a state in which door-side hinge arms of a door-side bracket are released from a hinge element, and restraint arms of a body-side bracket are restricted to the hinge element, taken along line A-A of FIG. 19.

Referring to FIG. 20, a first hinge hole 113 may be provided in the first hinge arm 111, and a second hinge hole 114 may be provided in the second hinge arm 112. The second hinge hole 114 may be aligned with the first hinge hole 113. In addition, the center roller unit 23 may have a restraint hole 116 provided in the second hinge arm 112 or the roller bracket 101.

Referring to FIG. 16, the roller arm 102 may be provided on the first end portion of the roller bracket 101 adjacent to the center rail 13, and the hinge element 110 may be provided on the second end portion of the roller bracket 101 relatively far from the center rail 13. Accordingly, the hinge element 110 may be spaced apart from the rollers 105 and 106.

Referring to FIG. 16, the vehicle door opening and closing apparatus, according to exemplary embodiments of the present disclosure, may include a door-side bracket 120 detachably connected to the hinge element 110 of the center roller unit 23, and a body-side bracket 130 detachably connected to the hinge element 110 of the center roller unit 23.

The door-side bracket 120 may be detachably connected to the hinge element 110 through a connection unit 170, and the body-side bracket 130 may be releasably restricted to the hinge element 110 or the roller bracket 101 through the connection unit 170.

Figure 21:
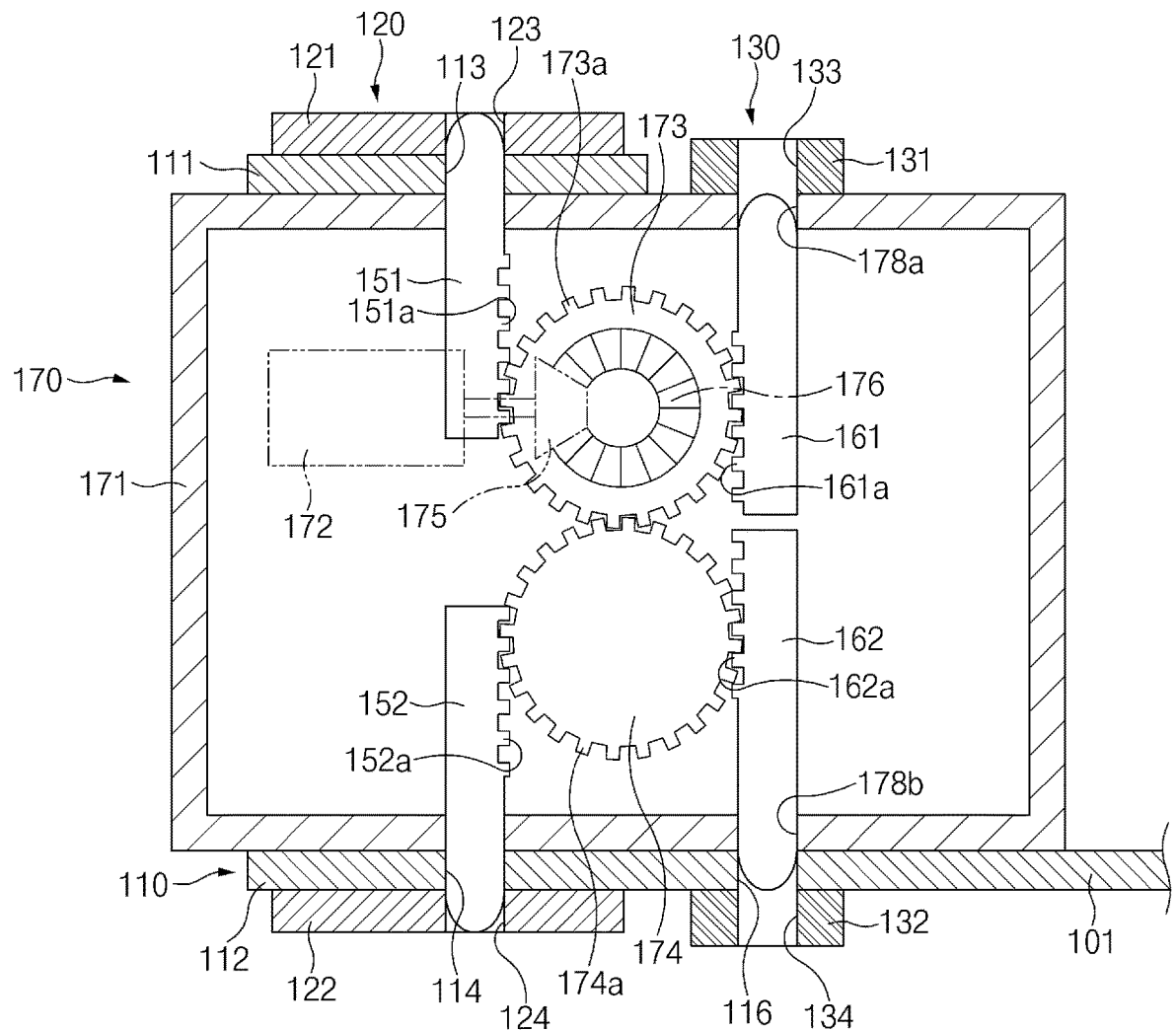
FIG. 21 illustrates a cross-sectional view of a state in which door-side hinge arms of a door-side bracket are restricted to a hinge element, and restraint arms of a body-side bracket are released from the hinge element, taken along line A-A of FIG. 19.

Referring to FIGS. 20 and 21, the connection unit 170 may include a connection body 171 mounted on the hinge element 110 and the roller bracket 101 of the center roller unit 23, and the connection body 171 may be fixed to the second hinge arm 112 of the hinge element 110 of the center roller unit 23 using fasteners, welding, and/or the like. A first door-side through hole 177a and a second door-side through hole 177b, may be provided in the connection body 171, and the first door-side through hole 177a and the second door-side through hole 177b, may be open to the door-side bracket 120. A first body-side through hole 178a and a second body-side through hole 178b may be provided in the connection body 171, and the first body-side through hole 178a and the second body-side through hole 178b may be open to the body-side bracket 130.

Figure 23:
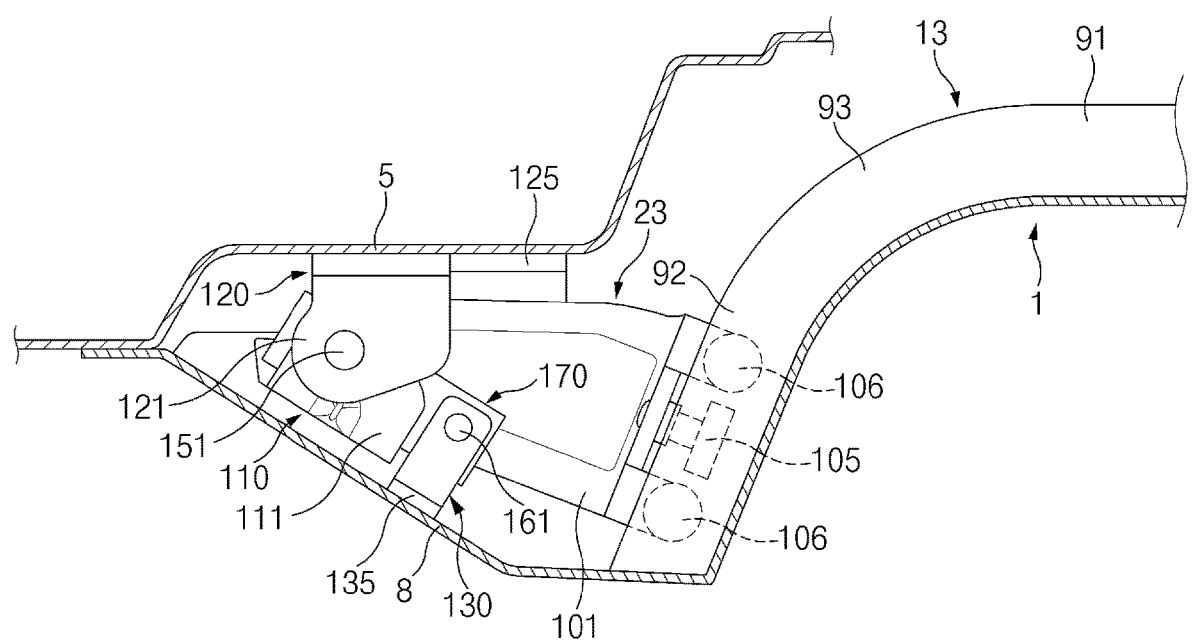
FIG. 23 illustrates a state in which a vehicle door is closed in a vehicle door opening and closing apparatus according to an exemplary embodiment of the present disclosure.

The door-side bracket 120 may be detachably connected to the hinge element 110 of the center roller unit 23 through the connection unit 170. Referring to FIG. 16, the door-side bracket 120 may include a door-side base 125. A first door-side hinge arm 121 and a second door-side hinge arm 122 may extend from the door-side base 125 toward the hinge element 110, and the first door-side hinge arm 121 may be spaced apart from the second door-side hinge arm 122. The first door-side hinge arm 121 and the second door-side hinge arm 122 may be angled from the door-side base 125. The door-side base 125 may be perpendicular to the first hinge arm 111 and the second hinge arm 112 of the hinge element 110, and each of the door-side hinge arms 121 and 122 may be perpendicular to the door-side base 125. The door-side hinge arms 121 and 122 may be parallel to the hinge arms 111 and 112 of the hinge element 110, respectively. Referring to FIG. 23, the door-side base 125 may be fixed to the edge of the vehicle door 5 using fasteners, welding, and/or the like.

Referring to FIGS. 20 and 21, a first hinge hole 123 may be provided in the first door-side hinge arm 121, and a second hinge hole 124 may be provided in the second door-side hinge arm 122. The first hinge hole 123 of the door-side bracket 120 may be aligned with the first hinge hole 113 of the hinge element 110 and the first door-side through hole 177a of the connection body 171, and the second hinge hole 124 of the door-side bracket 120 may be aligned with the second hinge hole 114 of the hinge element 110 and the second door-side through hole 177b of the connection body 171.

Referring to FIGS. 20 and 21, the first door-side hinge arm 121 may be releasably restricted to the first hinge arm 111 of the hinge element 110 by a movement of a first hinge pin 151. The first door-side through hole 177a of the connection body 171 may be aligned with the first hinge hole 123 of the door-side bracket 120 and the first hinge hole 113 of the hinge element no, and the first hinge pin 151 may be aligned with the first door-side through hole 177a of the connection body 171, the first hinge hole 113 of the hinge element 110, and the first hinge hole 123 of the door-side bracket 120. The first hinge pin 151 may be movable in the first door-side through hole 177a of the connection body 171, the first hinge hole 113 of the hinge element 110, and the first hinge hole 123 of the door-side bracket 120.

Referring to FIG. 20, as the first hinge pin 151 moves away from the first door-side hinge arm 121 of the door-side bracket 120, the first hinge pin 151 may be disengaged from the first hinge hole 123 of the door-side bracket 120. Accordingly, the first door-side hinge arm 121 of the door-side bracket 120 may be released from the first hinge arm iii of the hinge element 110.

Referring to FIG. 21, as the first hinge pin 151 moves toward the first door-side hinge arm 121 of the door-side bracket 120, the first hinge pin 151 may be engaged or inserted into the first hinge hole 123 of the door-side bracket 120. Accordingly, the first door-side hinge arm 121 of the door-side bracket 120 may be restricted to the first hinge arm 111 of the hinge element 110 by the first hinge pin 151.

Referring to FIGS. 20 and 21, the second door-side hinge arm 122 may be releasably restricted to the second hinge arm 112 of the hinge element 110 by a movement of a second hinge pin 152. The second door-side through hole 177b, of the connection body 171 may be aligned with the second hinge hole 124 of the door-side bracket 120 and the second hinge hole 114 of the hinge element 110, and the second hinge pin 152 may be aligned with the second door-side through hole 177b of the connection body 171, the second hinge hole 114 of the hinge element no, and the second hinge hole 124 of the door-side bracket 120. The second hinge pin 152 may be movable in the second door-side through hole 177b of the connection body 171, the second hinge hole 114 of the hinge element 110, and the second hinge hole 124 of the door-side bracket 120.

Referring to FIG. 20, as the second hinge pin 152 moves away from the second door-side hinge arm 122 of the door-side bracket 120, the second hinge pin 152 may be disengaged from the second hinge hole 124 of the door-side bracket 120. Accordingly, the second door-side hinge arm 122 of the door-side bracket 120 may be released from the second hinge arm 112 of the hinge element 110.

Referring to FIG. 21, as the second hinge pin 152 moves toward the second door-side hinge arm 122 of the door-side bracket 120, the second hinge pin 152 may be engaged or inserted into the second hinge hole 124 of the door-side bracket 120. Accordingly, the second door-side hinge arm 122 of the door-side bracket 120 may be restricted to the second hinge arm 112 of the hinge element 110 by the second hinge pin 152.

Figure 24:
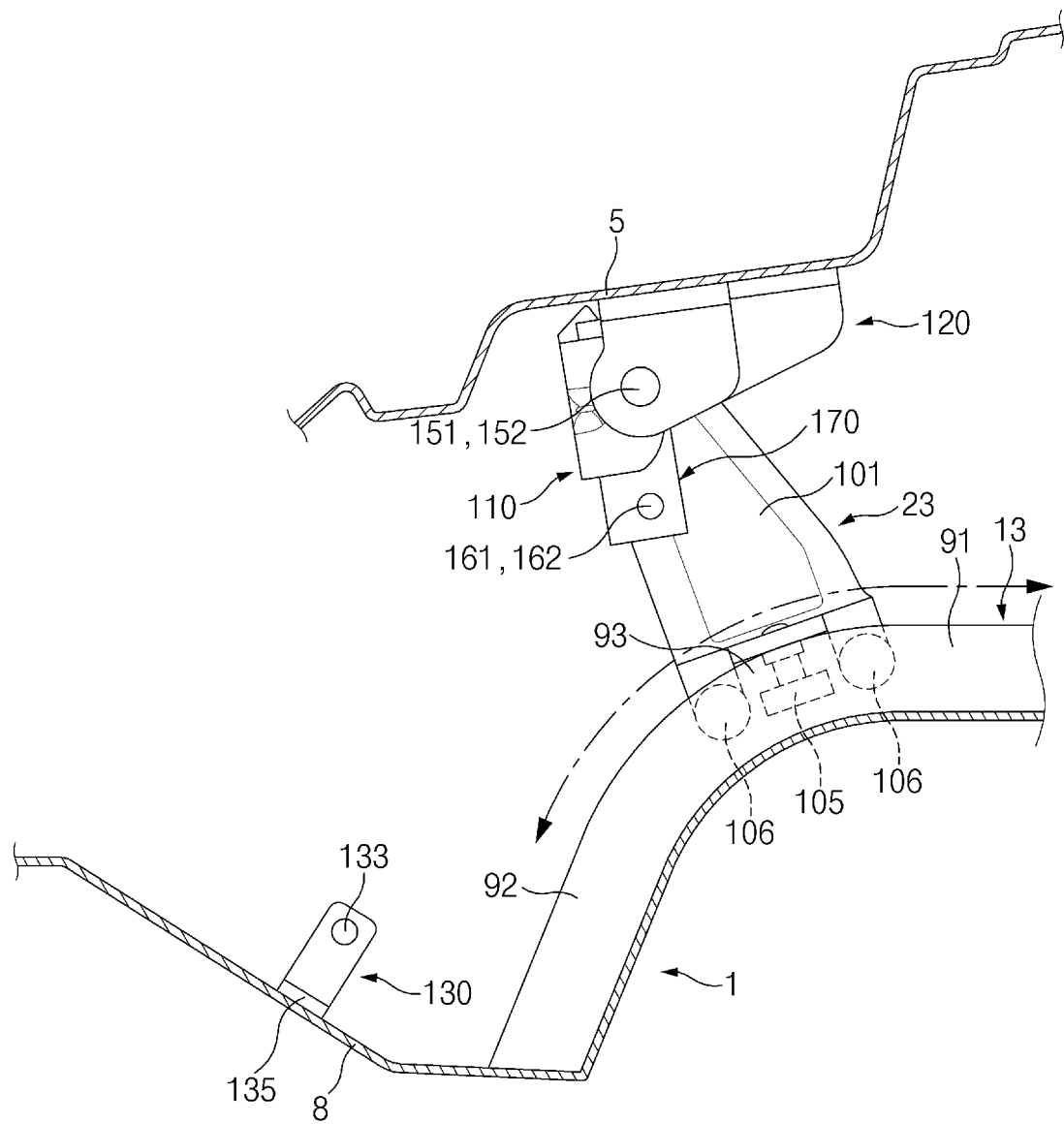
FIG. 24 illustrates a state in which a vehicle door is opened and closed in a sliding mode in a vehicle door opening and closing apparatus according to an exemplary embodiment of the present disclosure.

As illustrated in FIG. 21, the first door-side hinge arm 121 of the door-side bracket 120 may be restricted to the first hinge arm 111 of the hinge element 110 through the first hinge pin 151, and the second door-side hinge arm 122 of the door-side bracket 120 may be restricted to the second hinge arm 112 of the hinge element 110 through the second hinge pin 152. Accordingly, as illustrated in FIGS. 23 and 24, the door-side bracket 120 may be connected to the hinge element 110 of the center roller unit 23 through the first hinge pin 151 and the second hinge pin 152, and the door-side bracket 120 and the hinge element 110 may rotate relative to each other around the hinge pins 151 and 152.

Figure 25:
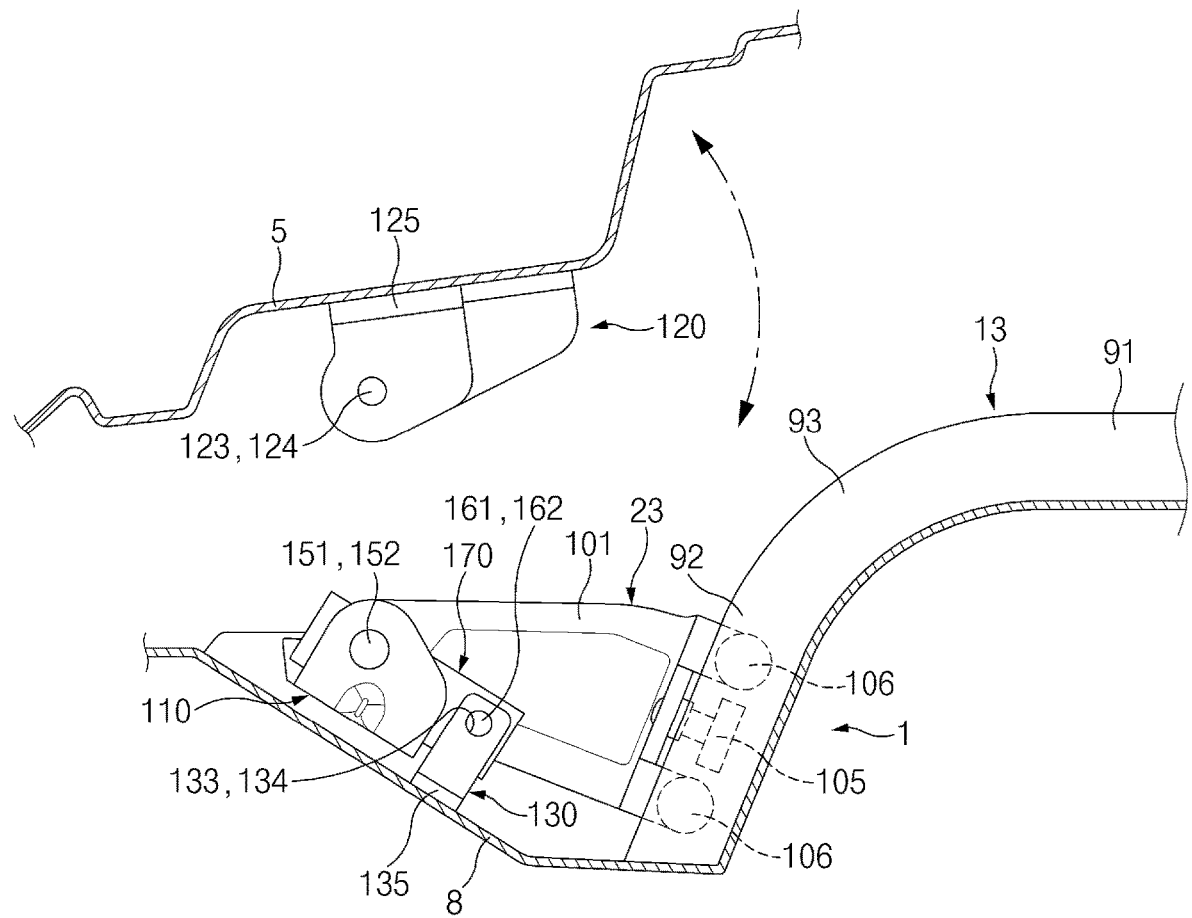
FIG. 25 illustrates a state in which a vehicle door is opened and closed in a swing mode in a vehicle door opening and closing apparatus according to an exemplary embodiment of the present disclosure.

As illustrated in FIG. 20, the first door-side hinge arm 121 of the door-side bracket 120 may be released from the first hinge arm 111 of the hinge element 110, and the second door-side hinge arm 122 of the door-side bracket 120 may be released from the second hinge arm 112 of the hinge element 110. Accordingly, as illustrated in FIG. 25, the door-side bracket 120 may be completely detached from the hinge element 110 of the center roller unit 23.

The first hinge pin 151 and the second hinge pin 152 may move linearly in opposite directions by an actuator 172 and a set of gears 173 and 174 provided inside the connection body 171.

Figure 22:
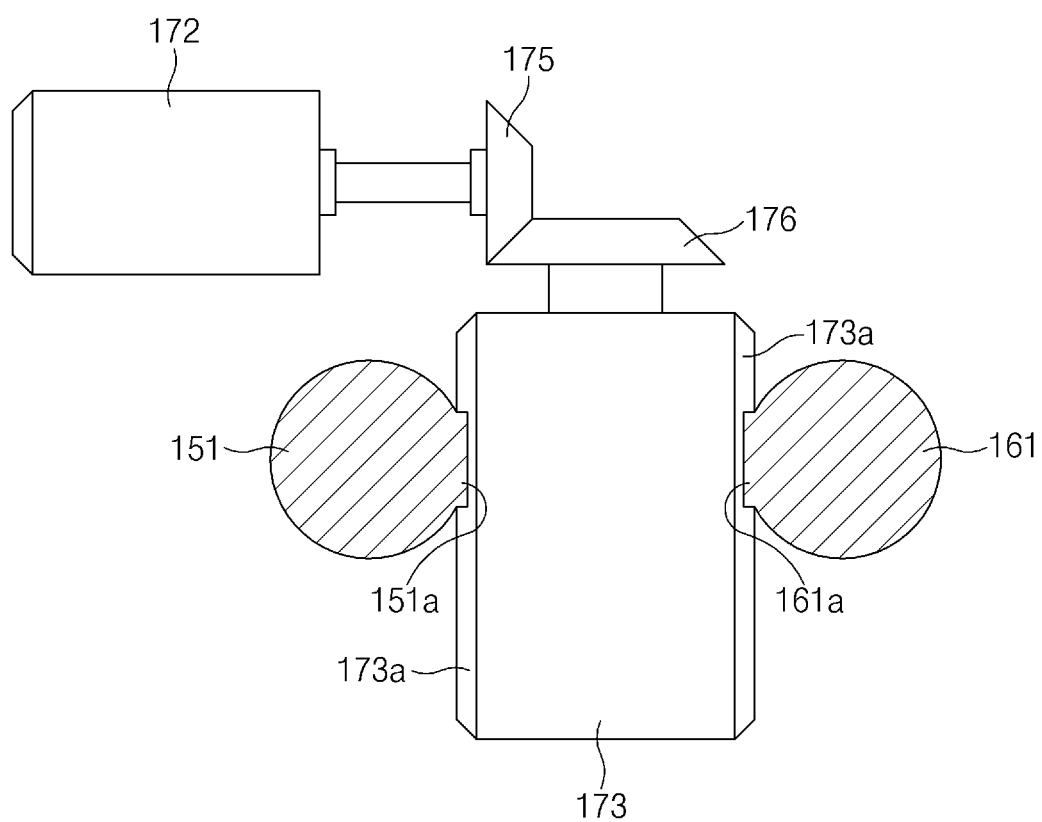
FIG. 22 illustrates a cross-sectional view, taken along line B-B of FIG. 20.

The actuator 172 may be a bi-directional motor which is rotatable in both directions. The set of gears 173 and 174 may include a first gear 173 and a second gear 174 meshing with each other. The actuator 172 may rotate any one of the first gear 173 and the second gear 174. Referring to FIG. 22, a drive gear 175 may be fixed to an output shaft of the actuator 172, and a driven gear 176 may be fixed to an upper end of the first gear 173. As the drive gear 175 meshes with the driven gear 176, the actuator 172 may rotate the first gear 173. For example, the drive gear 175 and the driven gear 176 may form a bevel gear set. Referring to FIGS. 20 and 21, teeth 173a of the first gear 173 may mesh with teeth 174a of the second gear 174. When the first gear 173 rotates in a predetermined direction, the second gear 174 may rotate in a direction opposite to the rotation direction of the first gear 173.

The first hinge pin 151 may move along a longitudinal axis thereof by the first gear 173. Specifically, the first hinge pin 151 may have a plurality of rack teeth 151a provided on at least a portion of an exterior surface thereof, and the teeth 173a of the first gear 173 may mesh with the rack teeth 151a of the first hinge pin 151. As the first gear 173 rotates, the first hinge pin 151 may move along the longitudinal axis thereof. The longitudinal axis of the first hinge pin 151 may be perpendicular to a longitudinal axis of the first gear 173.

The second hinge pin 152 may move along a longitudinal axis thereof by the second gear 174. Specifically, the second hinge pin 152 may have a plurality of rack teeth 152a provided on at least a portion of an exterior surface thereof, and the teeth 174a of the second gear 174 may mesh with the rack teeth 152a of the second hinge pin 152. As the second gear 174 rotates, the second hinge pin 152 may move along the longitudinal axis thereof. The longitudinal axis of the second hinge pin 152 may be perpendicular to a longitudinal axis of the second gear 174.

As the first gear 173 and the second gear 174 rotate in the opposite directions by the actuator 172, the first hinge pin 151 and the second hinge pin 152 may move linearly in the opposite directions.

Referring to FIG. 20, when the first hinge pin 151 moves downwardly, the second hinge pin 152 may move upwardly. The first hinge pin 151 may be disengaged from the first hinge hole 123 of the door-side bracket 120, and the second hinge pin 152 may be disengaged from the second hinge hole 124 of the door-side bracket 120.

Referring to FIG. 21, when the first hinge pin 151 moves upwardly, the second hinge pin 152 may move downwardly. The first hinge pin 151 may be engaged or inserted into the first hinge hole 123 of the door-side bracket 120, and the second hinge pin 152 may be engaged or inserted into the second hinge hole 124 of the door-side bracket 120.

The body-side bracket 130 may be mounted on the door frame area 8 of the vehicle body 1. Referring to FIG. 18, the body-side bracket 130 may include a body-side base 135, and a first restraint arm 131 and a second restraint arm 132 may extend from the body-side base 135 toward the hinge element 110. The first restraint arm 131 may be spaced apart from the second restraint arm 132. The body-side base 135 may be perpendicular to the first hinge arm 111 and the second hinge arm 112 of the hinge element 110, and each of the restraint arms 131 and 132 may be perpendicular to the body-side base 135. The restraint arms 131 and 132 may be parallel to the hinge arms 111 and 112 of the hinge element 110, respectively. Referring to FIG. 24, the body-side base 135 may be fixed to the door frame area 8 of the vehicle body 1 using fasteners, welding, and/or the like.

Referring to FIGS. 20 and 21, a first restraint hole 133 may be provided in the first restraint arm 131, and a second restraint hole 134 may be provided in the second restraint arm 132. The first restraint hole 133 of the body-side bracket 130 may be aligned with the first body-side through hole 178a of the connection body 171, and the second restraint hole 134 of the body-side bracket 130 may be aligned with the second body-side through hole 178b of the connection body 171 and the restraint hole 116 of the hinge element 110.

Referring to FIGS. 20 and 21, the first restraint arm 131 may be releasably restricted to the connection body 171 by a movement of a first restraint pin 161. The first body-side through hole 178a of the connection body 171 may be aligned with the first restraint hole 133 of the body-side bracket 130, and the first restraint pin 161 may be aligned with the first body-side through hole 178a of the connection body 171 and the first restraint hole 133 of the body-side bracket 130. The first restraint pin 161 may be movable in the first body-side through hole 178a of the connection body 171 and the first restraint hole 133 of the body-side bracket 130.

Referring to FIG. 20, as the first restraint pin 161 moves toward the first restraint arm 131 of the body-side bracket 130, the first restraint pin 161 may be engaged or inserted into the first restraint hole 133 of the body-side bracket 130. Accordingly, the first restraint arm 131 of the body-side bracket 130 may be restricted to the connection body 171.

Referring to FIG. 21, as the first restraint pin 161 moves away from the first restraint arm 131 of the body-side bracket 130, the first restraint pin 161 may be disengaged from the first restraint hole 133 of the body-side bracket 130. Accordingly, the first restraint arm 131 of the body-side bracket 130 may be released from the connection body 171.

Referring to FIGS. 20 and 21, the second restraint arm 132 may be releasably restricted to the connection body 171 by a movement of a second restraint pin 162. The second body-side through hole 178b of the connection body 171 may be aligned with the restraint hole 116 of the hinge element 110 of the center roller unit 23 and the second restraint hole 134 of the body-side bracket 130, and the second restraint pin 162 may be aligned with the second body-side through hole 178b of the connection body 171, the restraint hole 116 of the hinge element no of the center roller unit 23, and the second restraint hole 134 of the body-side bracket 130. The second restraint pin 162 may be movable in the second body-side through hole 178b of the connection body 171, the restraint hole 116 of the hinge element 110 of the center roller unit 23, and the second restraint hole 134 of the body-side bracket 130.

Referring to FIG. 20, as the second restraint pin 162 moves toward the second restraint arm 132 of the body-side bracket 130, the second restraint pin 162 may be engaged or inserted into the second restraint hole 134 of the body-side bracket 130. Accordingly, the second restraint arm 132 of the body-side bracket 130 may be restricted to the hinge element 110 of the center roller unit 23 and the connection body 171.

Referring to FIG. 21, as the second restraint pin 162 moves away from the second restraint arm 132 of the body-side bracket 130, the second restraint pin 162 may be disengaged from the second restraint hole 134 of the body-side bracket 130. Accordingly, the second restraint arm 132 of the body-side bracket 130 may be released from the hinge element 110 of the center roller unit 23 and the connection body 171.

As illustrated in FIG. 20, the first restraint arm 131 of the body-side bracket 130 may be restricted to the connection body 171 through the first restraint pin 161, and the second restraint arm 132 of the body-side bracket 130 may be restricted to the hinge element 110 of the center roller unit 23 and the connection body 171 through the second restraint pin 162. Accordingly, as illustrated in FIGS. 23 and 25, the body-side bracket 130 may be connected to the hinge element 110 of the center roller unit 23 and the connection body 171 through the first restraint pin 161 and the second restraint pin 162.

As illustrated in FIG. 21, the first restraint arm 131 of the body-side bracket 130 may be released from the connection body 171, and the second restraint arm 132 of the body-side bracket 130 may be released from the hinge element 110 of the center roller unit 23 and the connection body 171. Accordingly, as illustrated in FIG. 24, the body-side bracket 130 may be completely detached from the hinge element 110 of the center roller unit 23 and the connection body 171.

The first restraint pin 161 and the second restraint pin 162 may move linearly in opposite directions by the actuator 172, the first gear 173, and the second gear 174 disposed inside the connection body 171.

The first restraint pin 161 may move along a longitudinal axis thereof by the first gear 173. Specifically, the first restraint pin 161 may have a plurality of rack teeth 161a provided on at least a portion of an exterior surface thereof, and the teeth 173a of the first gear 173 may mesh with the rack teeth 161a of the first restraint pin 161. As the first gear 173 rotates, the first restraint pin 161 may move along the longitudinal axis thereof. The first restraint pin 161 may be sufficiently spaced apart from the first hinge pin 151 on an outer circumference of the first gear 173. In particular, the first restraint pin 161 may face the first hinge pin 151 with the first gear 173 disposed therebetween. Accordingly, the moving direction of the first restraint pin 161 may be opposite to the moving direction of the first hinge pin 151. Referring to FIG. 20, when the first hinge pin 151 moves downwardly, the first restraint pin 161 may move upwardly. Referring to FIG. 21, when the first hinge pin 151 moves upwardly, the first restraint pin 161 may move downwardly.

The longitudinal axis of the first restraint pin 161 may be perpendicular to the longitudinal axis of the first gear 173, and the longitudinal axis of the first restraint pin 161 may be parallel to the longitudinal axis of the first hinge pin 151.

The second restraint pin 162 may move along a longitudinal axis thereof by the second gear 174. Specifically, the second restraint pin 162 may have a plurality of rack teeth 162a provided on at least a portion of an exterior surface thereof, and the teeth 174a of the second gear 174 may mesh with the rack teeth 162a of the second restraint pin 162. As the second gear 174 rotates, the second restraint pin 162 may move along the longitudinal axis thereof.

The second restraint pin 162 may be sufficiently spaced apart from the second hinge pin 152 on an outer circumference of the second gear 174. In particular, the second restraint pin 162 may face the second hinge pin 152 with the second gear 174 disposed therebetween. Accordingly, the moving direction of the second restraint pin 162 may be opposite to the moving direction of the second hinge pin 152. Referring to FIG. 20, when the second hinge pin 152 moves upwardly, the second restraint pin 162 may move downwardly. Referring to FIG. 21, when the second hinge pin 152 moves downwardly, the second restraint pin 162 may move upwardly.

The longitudinal axis of the second restraint pin 162 may be perpendicular to the longitudinal axis of the second gear 174, and the longitudinal axis of the second restraint pin 162 may be parallel to the longitudinal axis of the second hinge pin 152.

As the first gear 173 and the second gear 174 rotate in the opposite directions by the actuator 172, the first restraint pin 161 and the second restraint pin 162 may move linearly in the opposite directions.

Referring to FIG. 20, when the first restraint pin 161 moves upwardly, the second restraint pin 162 may move downwardly. The first restraint pin 161 may be engaged or inserted into the first restraint hole 133 of the body-side bracket 130, and the second restraint pin 162 may be engaged or inserted into the second restraint hole 134 of the body-side bracket 130.

Referring to FIG. 21, when the first restraint pin 161 moves downwardly, the second restraint pin 162 may move upwardly. The first restraint pin 161 may be disengaged from the first restraint hole 133 of the body-side bracket 130, and the second restraint pin 162 may be disengaged from the second restraint hole 134 of the body-side bracket 130.

As illustrated in FIG. 23, when the vehicle door 5 is closed, the door-side bracket 120 and the body-side bracket 130 may be connected to the hinge element 110 of the center roller unit 23 through the connection unit 170.

When the user presses the first switch 41 of the selector 40 and the sliding mode is selected, the actuator 172 may rotate the first gear 173 clockwise and rotate the second gear 174 counterclockwise as illustrated in FIG. 21. Accordingly, the first hinge pin 151 may move upwardly so that the first hinge pin 151 may be engaged or inserted into the first hinge hole 123 of the door-side bracket 120, and the first restraint pin 161 may move downwardly so that the first restraint pin 161 may be disengaged from the first restraint hole 133 of the body-side bracket 130. The second hinge pin 152 may move downwardly so that the second hinge pin 152 may be engaged or inserted into the second hinge hole 124 of the door-side bracket 120, and the second restraint pin 162 may move upwardly so that the second restraint pin 162 may be disengaged from the second restraint hole 134 of the body-side bracket 130. That is, the body-side bracket 130 may be detachable from the hinge element 110 of the center roller unit 23, and the door-side bracket 120 may be rotatably connected to the hinge element 110 of the center roller unit 23 through the first hinge pin 151 and the second hinge pin 152. As the user slides the vehicle door 5 along the center rail 13, the hinge element 110 of the center roller unit 23 may rotate around the first hinge pin 151 and the second hinge pin 152 with respect to the door-side bracket 120 as illustrated in FIG. 24. That is, when the sliding mode is selected in a state in which the rollers 105 and 106 of the center roller unit 23 are connected to the center rail 13, the door-side bracket 120 may be connected to the hinge element 110 of the center roller unit 23 and the body-side bracket 130 may be detached from the hinge element 110 of the center roller unit 23 so that the vehicle door 5 may be smoothly opened and closed in the sliding mode.

When the user presses the second switch 42 of the selector 40 and the swing mode is selected, the actuator 172 may rotate the first gear 173 counterclockwise and rotate the second gear 174 clockwise as illustrated in FIG. 20. Accordingly, the first hinge pin 151 may move downwardly so that the first hinge pin 151 may be disengaged from the first hinge hole 123 of the door-side bracket 120, and the first restraint pin 161 may move upwardly so that the first restraint pin 161 may be engaged or inserted into the first restraint hole 133 of the body-side bracket 130. The second hinge pin 152 may move upwardly so that the second hinge pin 152 may be disengaged from the second hinge hole 124 of the door-side bracket 120, and the second restraint pin 162 may move downwardly so that the second restraint pin 162 may be engaged or inserted into the second restraint hole 134 of the body-side bracket 130. That is, the door-side bracket 120 may be detachable from the hinge element 110 of the center roller unit 23, and the body-side bracket 130 may be connected (restricted) to the hinge element 110 of the center roller unit 23 by the first restraint pin 161 and the second restraint pin 162. As the user swings the vehicle door 5 outwards, the vehicle door 5 and the door-side bracket 120 may be released from the center roller unit 23 as illustrated in FIG. 25. That is, when the swing mode is selected in a state in which the rollers 105 and 106 of the center roller unit 23 are connected to the center rail 13, the body-side bracket 130 may be connected to the hinge element 110 of the center roller unit 23 and the door-side bracket 120 may be detached from the hinge element 110 of the center roller unit 23 so that the vehicle door 5 may be smoothly opened and closed in the swing mode.

As illustrated in FIGS. 16 to 25, the center roller unit 23, the door-side bracket 120, and the body-side bracket 130 may be designed to allow the vehicle door 5 to easily move along different trajectories as any one mode of the swing mode and the sliding mode is selected. The present inventive concept is not limited thereto, and the center roller unit 23, the door-side bracket 120, and the body-side bracket 130 may be applied to various vehicle door structures.

Meanwhile, according to the exemplary embodiment illustrated in FIGS. 16 to 25, the door-side bracket 120, the body-side bracket 130, the connection unit 170, the actuator 172, and the set of gears 173 and 174 may be applied to the center roller unit 23 and the center rail 13. However, the present inventive concept is not limited thereto, and the door-side bracket 120, the body-side bracket 130, the connection unit 170, the actuator 172, and the set of gears 173 and 174 may also be applied to the upper rail 11 and the upper roller unit 21 and/or the lower rail 12 and the lower roller unit 22.

FIGS. 1 to 25 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 26:
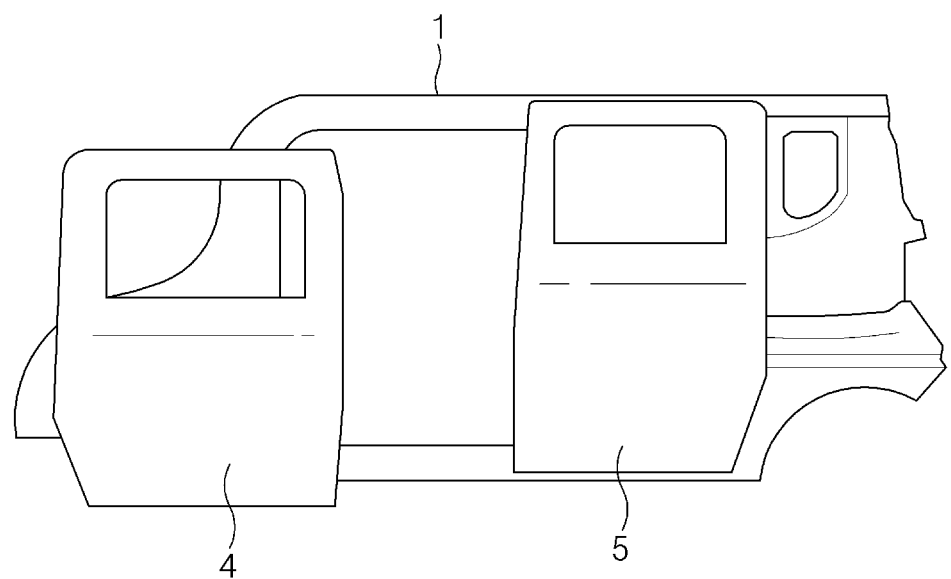
FIG. 26 illustrates a vehicle door opening and closing apparatus according to an exemplary embodiment of the present disclosure, which is applied to a front door of a vehicle, in a state in which the front door is opened in a sliding mode.
Figure 27:
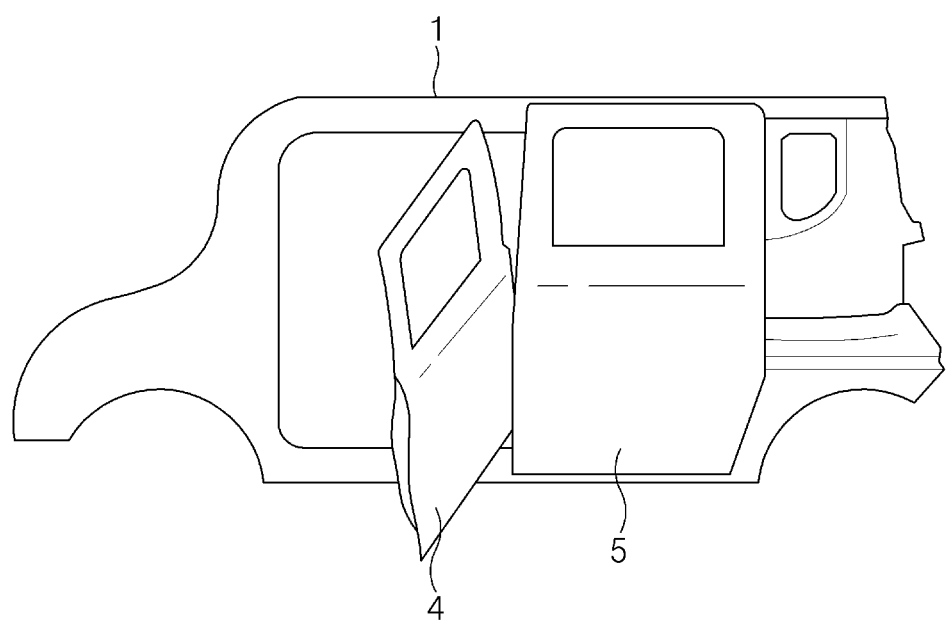
FIG. 27 illustrates a state in which the front door of FIG. 26 is opened in a swing mode.

FIGS. 26 and 27 illustrate the vehicle door opening and closing apparatus according to exemplary embodiments of the present disclosure applied to the front door 4. FIG. 26 illustrates a state in which the front door 4 is opened in the sliding mode, and FIG. 27 illustrates a state in which the front door 4 is opened in the swing mode.

Figure 28:
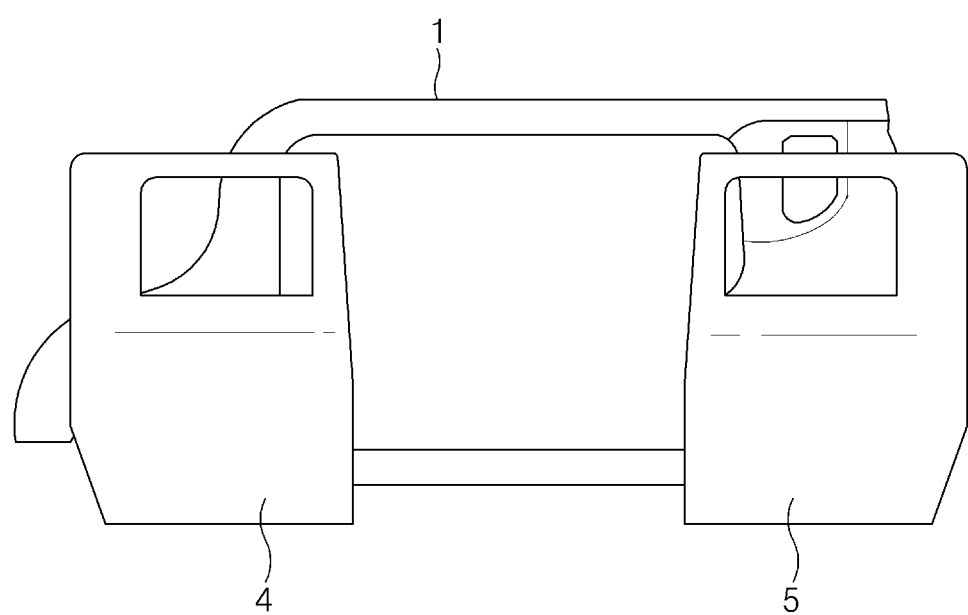
FIG. 28 illustrates a vehicle door opening and closing apparatus according to an exemplary embodiment of the present disclosure, which is applied to a front door and a rear door of a vehicle, in a state in which the front door and the rear door are opened in a sliding mode.
Figure 29:
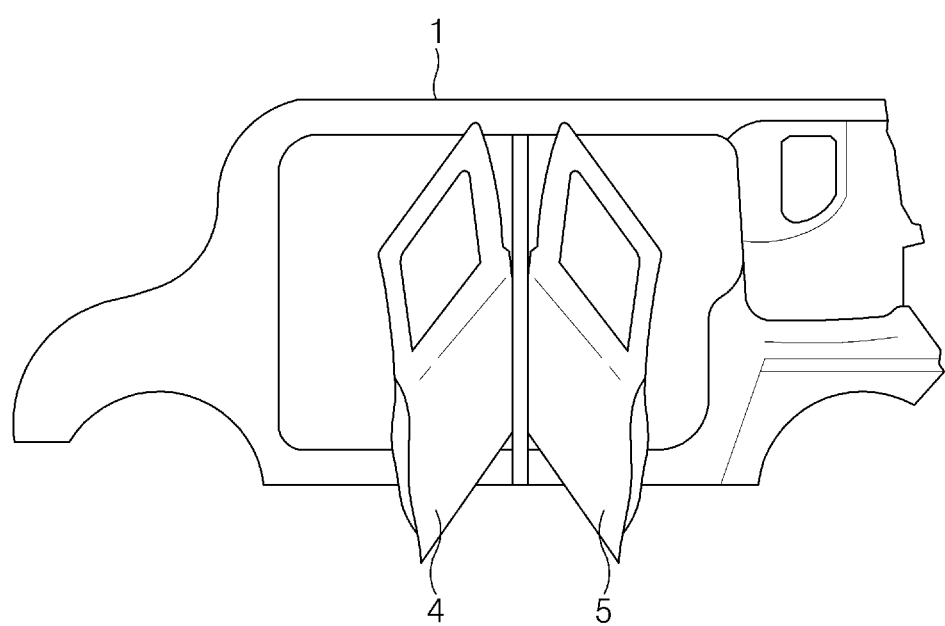
FIG. 29 illustrates a state in which the front door and the rear door of FIG. 28 are opened in a swing mode.

FIGS. 28 and 29 illustrate the vehicle door opening and closing apparatus according to exemplary embodiments of the present disclosure applied to both the front door 4 and the rear door 5. FIG. 28 illustrates a state in which the front door 4 and the rear door 5 are opened in the sliding mode, and FIG. 29 illustrates a state in which the front door 4 and the rear door 5 are opened in the swing mode.

As set forth above, the vehicle door opening and closing apparatus according to exemplary embodiments of the present disclosure may selectively switch the opening/closing operation of the vehicle door into the sliding mode and the swing mode, thereby meeting the needs of users such as convenience and diversity. By selecting the opening/closing operation of the vehicle door depending on the user's situation and environment, convenience and quality may be improved. In particular, the opening/closing operation of the vehicle door may be performed in any one mode selected from the sliding mode and the swing mode depending on the user's situation (location, time, purpose of use, etc.), environment (weather, season, etc.), the occupants' ages (children, adults, the elderly, etc.), and the like, and thus improved ease of use may be achieved. For example, when the vehicle is stopped on the roadside, the swing mode may be selected so that the occupants of all ages may quickly open and close the vehicle door with relatively little force. The sliding mode may be selected in a narrow space such as a parking lot so that a space for ingress and egress of the occupants may be relatively large, which enables quick ingress and egress of the occupants of all ages. The sliding mode may be selected for the ingress and egress of occupants such as small children, the elderly, and the disabled so that a relatively large space for ingress and egress may be provided to those vulnerable occupants. When vehicles are used for camping, loading freight/cargo, etc., the sliding mode may be selected to improve ease of use.

The vehicle door opening and closing apparatus, according to exemplary embodiments of the present disclosure, may be designed to prevent the rollers of the roller unit from being separated from the rail in any mode of the swing mode and the sliding mode, and allow the roller unit to be selectively and detachably connected to the vehicle door and a portion of the vehicle body adjacent to the vehicle door as any one mode of the swing mode and the sliding mode is selected. In particular, the roller unit may be detachably connected to the edge of the vehicle door and the door frame area of the vehicle body adjacent to the door opening. Thus, the vehicle door may be stably opened and closed in any mode of the swing mode and the sliding mode.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
   a vehicle door configured to be selectively opened and closed in a mode of a sliding mode and a swing mode to uncover and cover a door opening of a vehicle body;
   a rail mounted on the vehicle body;
   a roller unit including a roller and a hinge element, the roller being configured to be guided along the rail, the hinge element being spaced apart from the roller;
   a door-side bracket mounted on the vehicle door, the door-side bracket being detachably connected to the roller unit; and
   a body-side bracket mounted on the vehicle body, the body-side bracket being detachably connected to the roller unit.

2. The vehicle door opening and closing apparatus according to claim 1, wherein the body-side bracket is configured to be detachable from the roller unit when the door-side bracket is connected to the roller unit, and the door-side bracket is configured to be detachable from the roller unit when the body-side bracket is connected to the roller unit.

3. The vehicle door opening and closing apparatus according to claim 1, wherein the door-side bracket is detachably connected to the hinge element by a hinge pin.

4. The vehicle door opening and closing apparatus according to claim 3, wherein the hinge pin is configured to move in a hole of the door-side bracket and a hole of the hinge element.

5. The vehicle door opening and closing apparatus according to claim 3, wherein the door-side bracket includes a door-side base fixed to the vehicle door, and a door-side hinge arm extending from the door-side base toward the hinge element.

6. The vehicle door opening and closing apparatus according to claim 5, wherein the door-side hinge arm includes a hinge hole, the hinge pin being configured to be detachably engaged into the hinge hole.

7. The vehicle door opening and closing apparatus according to claim 1, wherein the body-side bracket is detachably connected to the hinge element by a restraint pin.

8. The vehicle door opening and closing apparatus according to claim 7, wherein the restraint pin is configured to move in a hole of the body-side bracket and a hole of the hinge element.

9. The vehicle door opening and closing apparatus according to claim 7, wherein the body-side bracket includes a body-side base fixed to the vehicle body, and a restraint arm extending from the body-side base toward the hinge element.

10. The vehicle door opening and closing apparatus according to claim 9, wherein the restraint arm includes a restraint hole, the restraint pin being configured to be detachably engaged into the restraint hole.

11. The vehicle door opening and closing apparatus according to claim 1, wherein the vehicle door is configured to be opened and closed in the sliding mode when the door-side bracket is connected to the hinge element and the body-side bracket is detached from the hinge element.

12. The vehicle door opening and closing apparatus according to claim 1, wherein the vehicle door is configured to be opened and closed in the swing mode when the body-side bracket is connected to the hinge element and the door-side bracket is detached from the hinge element.

13. The vehicle door opening and closing apparatus according to claim 1, wherein the door-side bracket is configured to be detachably connected to the hinge element by a movement of a hinge pin,
the hinge pin has rack teeth,
the rack teeth of the hinge pin mesh with teeth of a gear configured to be rotated by an actuator, and
the hinge pin moves linearly as the gear rotates.

14. The vehicle door opening and closing apparatus according to claim 1, wherein the body-side bracket is configured to be detachably connected to the hinge element by a movement of a restraint pin,
the restraint pin has rack teeth,
the rack teeth of the restraint pin mesh with teeth of a gear configured to be rotated by an actuator, and
the restraint pin moves linearly as the gear rotates.

15. The vehicle door opening and closing apparatus according to claim 1, wherein the door-side bracket is detachably connected to the hinge element by a movement of a hinge pin,
the hinge pin has rack teeth,
the body-side bracket is detachably connected to the hinge element by a movement of a restraint pin,
the restraint pin has rack teeth facing the rack teeth of the hinge pin,
the hinge pin and the restraint pin mesh with teeth of a gear configured to be rotated by an actuator,
the hinge pin and the restraint pin face each other with the gear disposed therebetween, and
the hinge pin and the restraint pin move linearly in opposite directions as the gear rotates.

16. The vehicle door opening and closing apparatus according to claim 15, further comprising a connection body mounted on the hinge element,
wherein the hinge pin, the restraint pin, the actuator, and the gear are disposed inside the connection body.

17. A vehicle door apparatus, comprising:
a vehicle door configured to be selectively opened and closed in a mode of a sliding mode and a swing mode to uncover and cover a door opening of a vehicle body;
a rail mounted on the vehicle body;
a roller unit including a roller and a hinge element, the roller unit configured to be guided along the rail;
a door-side bracket mounted on the vehicle door, the door-side bracket being detachably connected to the hinge element of the roller unit by a hinge pin; and
a body-side bracket mounted on the vehicle body, the body-side bracket being detachably connected to the hinge element of the roller unit by a restraint pin, the door-side bracket being configured to be detachable from the roller unit when the body-side bracket is connected to the roller unit, the body-side bracket being configured to be detachable from the roller unit when the door-side bracket is connected to the roller unit.

18. The vehicle door apparatus according to claim 17, wherein
the hinge pin has rack teeth,
the restraint pin has rack teeth facing the rack teeth of the hinge pin,
the hinge pin and the restraint pin mesh with teeth of a gear configured to be rotated by an actuator,
the hinge pin and the restraint pin face each other with the gear disposed therebetween, and
the hinge pin and the restraint pin are configured to move linearly in opposite directions as the gear rotates.

19. The vehicle door apparatus according to claim 18, further comprising a connection body mounted on the hinge element, wherein the hinge pin, the restraint pin, the actuator, and the gear are disposed inside the connection body.

\* \* \* \* \*